United States Patent
Iwata et al.

(10) Patent No.: US 6,835,147 B2
(45) Date of Patent: Dec. 28, 2004

(54) HYDRAULIC PRESSURE CONTROLLER FOR AUTOMATIC TRANSMISSION

(75) Inventors: Akihito Iwata, Anjo (JP); Norio Imai, Anjo (JP); Masashi Hattori, Anjo (JP); Ryoji Habuchi, Toyota (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 126 days.

(21) Appl. No.: 10/262,674

(22) Filed: Oct. 2, 2002

(65) Prior Publication Data

US 2003/0083169 A1 May 1, 2003

(30) Foreign Application Priority Data

Oct. 11, 2001 (JP) ........................................ 2001-314367

(51) Int. Cl.$^7$ ........................... F16H 61/14; F16H 63/34
(52) U.S. Cl. ............................................. 474/28; 474/18
(58) Field of Search ............................. 474/18, 28, 43; 477/45, 46, 48, 64; 475/156, 69; 192/3.3, 3.31, 3.29

(56) References Cited

U.S. PATENT DOCUMENTS 4,589,537 A * 5/1986 Nishikawa et al. ........... 477/64
5,273,492 A * 12/1993 Kashiwase et al. ........... 474/43
5,454,291 A * 10/1995 Ulm et al. ..................... 91/445
5,833,565 A * 11/1998 Yasue et al. ................. 475/156
6,474,456 B2 * 11/2002 Suzuki et al. ............... 192/3.29

FOREIGN PATENT DOCUMENTS

JP 62-67362 A * 3/1987 ........... F16H/45/02
JP 02-134459 A * 5/1990 ................. 477/906

* cited by examiner

Primary Examiner—Marcus Charles
(74) Attorney, Agent, or Firm—Lorusso, Loud & Kelly

(57) ABSTRACT

A hydraulic controller of an automatic transmission which releases the lockup clutch when it fails. An output port of a solenoid valve is connected to a port of a lockup control valve and a port of a garage shift valve. An output port of a solenoid valve is connected to a port of the lockup control valve and a port of the garage shift valve. At least one of the solenoid valves is freely duty-controlled. A pattern, which enables regular control of the automatic transmission in normal operation and does not allow the lockup clutch to change from its released state to its engaged state, is selected for use from among plural combinations of signal pressures of the solenoid valves.

19 Claims, 13 Drawing Sheets

| DIRECT | COMBINATION OF PATTERN | | NORMAL TIME | | SOL1 OFF FAIL | | SOL1 ON FAIL | | SOL2 OFF FAIL | | SOL2 ON FAIL | | USAGE CONDITION FOR FAILURE |
|---|---|---|---|---|---|---|---|---|---|---|---|---|---|
| | SOL1 | SOL2 | L-UP | GARAGE | L-UP | GARAGE | L-UP | GARAGE | L-UP | GARAGE | L-UP | GARAGE | |
| P311 | X | X | OFF | RANGE PRESSURE | OFF | RANGE PRESSURE | ON | RANGE PRESSURE | OFF | RANGE PRESSURE | OFF | DIRECT | NOT ESTABLISHED |
| P312 | X | O | OFF | DIRECT | OFF | DIRECT | ON | DIRECT | OFF | RANGE PRESSURE | OFF | DIRECT | NOT ESTABLISHED |
| P313 | O | X | ON | RANGE PRESSURE | OFF | RANGE PRESSURE | ON | RANGE PRESSURE | ON | RANGE PRESSURE | ON | DIRECT | ESTABLISHED |
| P314 | O | O | ON | DIRECT | OFF | DIRECT | ON | DIRECT | OFF | DIRECT | ON | DIRECT | ESTABLISHED |

O: ON, X: OFF

| DIRECT | COMBINATION OF PATTERN | | NORMAL TIME | | SOL1 OFF FAIL | | SOL1 ON FAIL | | SOL2 OFF FAIL | | SOL2 ON FAIL | | USAGE CONDITION FOR FAILURE |
|---|---|---|---|---|---|---|---|---|---|---|---|---|---|
| | SOL1 | SOL2 | L-UP | GARAGE | L-UP | GARAGE | L-UP | GARAGE | L-UP | GARAGE | L-UP | GARAGE | |
| P101 | X | X | OFF | RANGE PRESSURE | OFF | RANGE PRESSURE | ON | GARAGE | OFF | GARAGE | OFF | GARAGE | NOT ESTABLISHED |
| P102 | X | O | OFF | DIRECT | OFF | DIRECT | OFF | RANGE PRESSURE | OFF | RANGE PRESSURE | OFF | DIRECT | ESTABLISHED |
| P103 | O | X | ON | RANGE PRESSURE | OFF | RANGE PRESSURE | ON | RANGE PRESSURE | ON | RANGE PRESSURE | OFF | DIRECT | ESTABLISHED |
| P104 | O | O | OFF | RANGE PRESSURE | OFF | DIRECT | OFF | RANGE PRESSURE | ON | RANGE PRESSURE | OFF | RANGE PRESSURE | NOT ESTABLISHED |
| P105 | DUTY | X | OFF | RANGE PRESSURE | OFF | RANGE PRESSURE | ON | RANGE PRESSURE | OFF | RANGE PRESSURE | OFF | RANGE PRESSURE | NOT ESTABLISHED |
| P106 | DUTY | O | OFF | RANGE PRESSURE | OFF | DIRECT | OFF | RANGE PRESSURE | OFF | DIRECT | OFF | RANGE PRESSURE | ESTABLISHED |
| P107 | X | DUTY | OFF | RANGE PRESSURE | OFF | RANGE PRESSURE | OFF | RANGE PRESSURE | OFF | RANGE PRESSURE | OFF | DIRECT | ESTABLISHED |
| P108 | O | DUTY | OFF | RANGE PRESSURE | OFF | RANGE PRESSURE | OFF | RANGE PRESSURE | ON | RANGE PRESSURE | OFF | RANGE PRESSURE | NOT ESTABLISHED |
| P109 | DUTY | DUTY | OFF | RANGE PRESSURE | OFF | RANGE PRESSURE | OFF | RANGE PRESSURE | OFF | RANGE PRESSURE | OFF | RANGE PRESSURE | NOT ESTABLISHED |

O: ON, X: OFF

FIG. 7

SOL1:DUTY
SOL2:ON
L-up OFF

SOL1:DUTY

SOL2:ON

SOL1:OFF
SOL2:DUTY
L-up OFF

SOL:1 OFF

SOL2:DUTY

| RUNNING CONDITION | PATTERN | COMBINATION OF PATTERN | | NORMAL TIME | | SOL1 OFF FAIL | | SOL1 ON FAIL | | SOL2 OFF FAIL | | SOL2 ON FAIL | |
|---|---|---|---|---|---|---|---|---|---|---|---|---|---|
| | | SOL1 | SOL2 | L-UP | GARAGE | L-UP | GARAGE | L-UP | GARAGE | L-UP | GARAGE | L-UP | GARAGE |
| AT A TIME STOPPED (N/P RANGE) | P102 | × | ○ | OFF | DIRECT | OFF | DIRECT | OFF | RANGE PRESSURE | OFF | RANGE PRESSURE | OFF | DIRECT |
| AT A TIME OF STARTUP (N-D, N-R) | P102 | × | ○ | OFF | DIRECT | OFF | DIRECT | OFF | RANGE PRESSURE | OFF | RANGE PRESSURE | OFF | DIRECT |
| L-UP OFF (D, R) | P106 | DUTY | ○ | OFF | RANGE PRESSURE | OFF | DIRECT | OFF | RANGE PRESSURE | (OFF) | RANGE PRESSURE | OFF | RANGE PRESSURE |
| L-UP CONTROL | P105 | DUTY | × | (OFF) | RANGE PRESSURE | (OFF) | RANGE PRESSURE | ON | RANGE PRESSURE | (OFF) | RANGE PRESSURE | (OFF) | RANGE PRESSURE |
| L-UP ON | P103 | ○ | × | ON | RANGE PRESSURE | OFF | DIRECT | ON | RANGE PRESSURE | ON | RANGE PRESSURE | OFF | RANGE PRESSURE |
| AT A LOW TEMPERATURE (AT A TIME OF STARTUP) | P102 | × | ○ | OFF | DIRECT | OFF | DIRECT | OFF | RANGE PRESSURE | OFF | RANGE PRESSURE | OFF | DIRECT |
| AT A LOW TEMPERATURE (D, R) | P104 | ○ | ○ | OFF | RANGE PRESSURE | OFF | DIRECT | OFF | RANGE PRESSURE | ON | RANGE PRESSURE | OFF | RANGE PRESSURE |
| | P101 | × | × | OFF | RANGE PRESSURE | OFF | RANGE PRESSURE | | | | | | |

○: ON,  ×: OFF

| DIRECT | COMBINATION OF PATTERN | | NORMAL TIME | | SOL1 OFF FAIL | | SOL1 ON FAIL | | SOL2 OFF FAIL | | SOL2 ON FAIL | | USAGE CONDITION FOR FAILURE |
|---|---|---|---|---|---|---|---|---|---|---|---|---|---|
| | SOL1 | SOL2 | L-UP | GARAGE | L-UP | GARAGE | L-UP | GARAGE | L-UP | GARAGE | L-UP | GARAGE | |
| P211 | X | X | OFF | RANGE PRESSURE | OFF | RANGE PRESSURE | ON | RANGE PRESSURE | OFF | RANGE PRESSURE | OFF | RANGE PRESSURE | NOT ESTABLISHED |
| P212 | X | O | OFF | RANGE PRESSURE | OFF | RANGE PRESSURE | OFF | DIRECT | OFF | RANGE PRESSURE | OFF | RANGE PRESSURE | ESTABLISHED |
| P213 | O | X | ON | RANGE PRESSURE | OFF | RANGE PRESSURE | ON | RANGE PRESSURE | ON | RANGE PRESSURE | ON | DIRECT | ESTABLISHED |
| P214 | O | O | OFF | DIRECT | OFF | RANGE PRESSURE | OFF | DIRECT | ON | RANGE PRESSURE | ON | DIRECT | NOT ESTABLISHED |

O: ON, X: OFF

| DIRECT | Combination of Pattern | | Normal Time | | SOL1 OFF FAIL | | SOL1 ON FAIL | | SOL2 OFF FAIL | | SOL2 ON FAIL | | Usage Condition for Failure |
|---|---|---|---|---|---|---|---|---|---|---|---|---|---|
| | SOL1 | SOL2 | L-UP | GARAGE | L-UP | GARAGE | L-UP | GARAGE | L-UP | GARAGE | L-UP | GARAGE | |
| P201 | X | X | OFF | RANGE PRESSURE | OFF | RANGE PRESSURE | ON | RANGE PRESSURE | OFF | RANGE PRESSURE | OFF | RANGE PRESSURE | NOT ESTABLISHED |
| P202 | X | O | OFF | RANGE PRESSURE | OFF | RANGE PRESSURE | OFF | DIRECT | OFF | RANGE PRESSURE | OFF | RANGE PRESSURE | ESTABLISHED |
| P203 | O | X | ON | RANGE PRESSURE | OFF | RANGE PRESSURE | ON | RANGE PRESSURE | ON | RANGE PRESSURE | OFF | DIRECT | ESTABLISHED |
| P204 | O | O | OFF | DIRECT | OFF | RANGE PRESSURE | OFF | DIRECT | ON | RANGE PRESSURE | OFF | DIRECT | NOT ESTABLISHED |
| P205 | DUTY | X | OFF | RANGE PRESSURE | OFF | RANGE PRESSURE | ON | RANGE PRESSURE | OFF | RANGE PRESSURE | OFF | DIRECT | NOT ESTABLISHED |
| P206 | DUTY | O | OFF | DIRECT | OFF | RANGE PRESSURE | OFF | DIRECT | OFF | RANGE PRESSURE | OFF | DIRECT | ESTABLISHED |
| P207 | X | DUTY | OFF | RANGE PRESSURE | OFF | RANGE PRESSURE | OFF | DIRECT | OFF | RANGE PRESSURE | OFF | RANGE PRESSURE | ESTABLISHED |
| P208 | O | DUTY | OFF | DIRECT | OFF | RANGE PRESSURE | OFF | DIRECT | ON | RANGE PRESSURE | OFF | DIRECT | NOT ESTABLISHED |
| P209 | DUTY | DUTY | OFF | RANGE PRESSURE | OFF | RANGE PRESSURE | OFF | DIRECT | OFF | RANGE PRESSURE | OFF | DIRECT | NOT ESTABLISHED |

O: ON, X: OFF

SOL1:DUTY
SOL2:ON
DIRECT

SOL1:OFF
SOL2:DUTY
RANGE PRESSURE

HYDRAULIC PRESSURE CONTROLLER FOR AUTOMATIC TRANSMISSION

BACKGROUND OF THE INVENTION

1. Field of the Invention

The present invention relates to a hydraulic pressure control apparatus for an automatic transmission mounted on a vehicle or the like and more particularly to a hydraulic pressure control apparatus which prevents a lockup clutch from becoming engaged when a solenoid valve fails.

2. Description of the Related Art

Conventionally, in an automatic transmission mounted on a vehicle or the like, particularly an automatic transmission having a continuously variable transmission (CVT), a torque converter is provided between a drive source such as an engine and an input shaft of that automatic transmission. The torque converter contains a lock-up clutch, which is engaged to couple a front cover to which output rotation of the engine is input from the input shaft. Usually, the lock-up clutch is engaged when the vehicle is traveling, so that the rotation of the engine is connected directly to the input shaft of the automatic transmission so as to improve fuel economy.

The aforementioned lockup clutch is controlled by the hydraulic controller of the automatic transmission, whereby it is engaged or released. If any trouble such as a short-circuit occurs in the hydraulic controller (failure), the vehicle may be stopped with the lockup clutch engaged. Because the vehicle wheels are connected directly to the engine by engagement of the lock-up clutch, the engine is stopped immediately when the vehicle stops, i.e., so-called engine stall occurs. If the engine is stopped, the vehicle needs to be towed for repair because the vehicle cannot travel. Thus, two valves (for example, lockup relay valve and lockup control valve) are provided in the hydraulic controller for controlling the lockup clutch, so that if a solenoid valve driving one valve fails, a solenoid valve driving the other valve is actuated to allow the lockup clutch to release and thereby enable the vehicle to travel.

In recent years emphasis has been placed on making the automatic transmission and the hydraulic controller more compact. Consequently, a hydraulic controller having only one valve for controlling the lockup clutch (for example, only a lockup control valve) has been proposed for the purpose of conserving space in the hydraulic controller. In such a hydraulic controller, upon reaching a predetermined shifting speed (for example, a first speed stage), the lockup clutch is mechanically released and, if the solenoid valve controlling the aforementioned valve fails, the aforementioned shift stage is fixed by the failure.

In particular, an automatic transmission having a continuously variable transmission mechanism needs to detect a gear ratio for determining the aforementioned predetermined shifting speed. Accordingly, a mechanism for detecting the gear ratio is required in such an automatic transmission. Thus, although the hydraulic controller can be made more compact by employing only one valve for controlling the lockup clutch, such a mechanism for detecting gear ratio requires enlargement of the automatic transmission overall, increases the production cost, and makes the configuration more complicated.

SUMMARY OF THE INVENTION

To solve the aforementioned problems, it is an object of the present invention to provide a hydraulic controller for an automatic transmission which uses a combination of hydraulic pressures adjusted to at least three stages with a first solenoid valve and a second solenoid valve in normal operation, so that a predetermined state is established in the automatic transmission if a failure occurs in the first or second solenoid valve. Establishment of the predetermined state may be by switching pressure signal or by maintaining the pressure signals as they were immediately prior to the failure.

To achieve the aforementioned object, in one aspect the invention provides a hydraulic controller for controlling an automatic transmission by adjusting and switching hydraulic pressure from a hydraulic pressure generating source, the hydraulic controller has:

a first solenoid valve for outputting a signal pressure by adjusting a supplied hydraulic pressure;

a second solenoid valve for outputting a signal pressure by adjusting a supplied hydraulic pressure;

a first switching valve which is switched based on the signal pressure of the first solenoid valve and the signal pressure of the second solenoid valve; and a second switching valve which is switched based on the signal pressure of the first solenoid valve and the signal pressure of the second solenoid valve, in which at least one of the first solenoid valve and the second solenoid valve is capable of freely adjusting the signal pressure to one of three or more stages. If the first solenoid valve or the second solenoid valve becomes disabled in a predetermined state of (failure) travel, a combination of the signal pressure of the first solenoid valve and the signal pressure of the second solenoid valve, which combination is used in normal operation, for such failure so as to bring the automatic transmission into a state predetermined for such a failure.

Accordingly, at least one of the first solenoid valve and the second solenoid valve is capable of adjusting the signal pressure to one of three or more stages and the first and second switching valves are switched based on the signal pressures as adjusted by the first and second solenoid valves. Then, a combination of the signal pressures as adjusted by the first and second solenoid valves when the first and second solenoid valves are operated normally is used in order to bring the automatic transmission into a state pre-determined for the event that the first or second solenoid valve becomes disabled in a given state of travel. Therefore, although necessary control of the automatic transmission is provided for normal operation, the automatic transmission can be brought into the state predetermined for the event that the first or second solenoid valve becomes disabled, i.e., cannot be operated.

In a preferred embodiment the present invention provides a hydraulic controller for an automatic transmission in which at least one of the first solenoid valve and the second solenoid valve is freely duty-controlled so that the signal pressure can be adjusted to one of three stages, namely ON control, the duty control and OFF control.

According to another preferred embodiment of the present invention, there is provided a hydraulic controller for an automatic transmission in which the first switching valve and the second switching valve each have a biasing member for biasing its switch position in one direction. The first switching valve receives the signal pressure of the first solenoid valve in the biasing direction of the biasing member and the signal pressure of the second solenoid valve in a direction opposite to the biasing direction of the biasing member. The second switching valve receives the signal pressure of the first solenoid valve in a direction opposite to the biasing direction of the biasing member and receives the signal pressure of the second solenoid valve in the biasing direction of the biasing member. Thus, in normal operation, the positions of the first and second switching valves can be controlled based on hydraulic pressure adjusted by the biasing force of the biasing member and that of the signal pressures of the first and second solenoid valves. If the first solenoid valve or the second solenoid valve malfunctions, the switching position of the first or second switching valve can be controlled by the adjusted pressure (signal pressure) of the other solenoid valve.

According to yet another preferred embodiment of the present invention, there is provided a hydraulic controller for an automatic transmission in which the first switching valve is a control valve disposed on a torque converter for switching the engagement state of the lockup clutch, and the second switching valve is a switching valve for selectively switching between at least two hydraulic pressures supplied to a hydraulic servo which engages a frictional engaging element when the vehicle travels forward or to a hydraulic servo which engages a frictional engaging element when the vehicle travels in reverse.

Thus, not only control of the automatic transmission necessary for normal operation is provided, but also in the event of failure of the first or second solenoid valve, the friction engaging element which is engaged with the lockup clutch when the vehicle travels forward or backward can be brought into a predetermined state. Further, two valves necessary for controlling the lockup clutch to a predetermined state can be reduced to only one switching valve, so that the hydraulic controller can be made more compact.

According to yet another preferred embodiment of the present invention, there is provided a hydraulic controller for an automatic transmission in which the predetermined state is a state in which the lockup clutch is not changed from the released state to the engaged state when the first solenoid valve and the second solenoid valve operate normally. Thus, the lockup clutch can be prevented from becoming engaged and, in particular, the engine can be kept from stopping at the same time when the vehicle stops. Consequently, even if the first and second solenoid valves malfunction, the vehicle can continue to travel.

According to a yet further preferred embodiment of the present invention, there is provided a hydraulic controller for an automatic transmission in which the first solenoid valve is capable of duty-control so that the signal pressure can be selectively adjusted to three stages, i.e., ON control, the duty control and OFF control, and the second solenoid valve is capable of controlling the signal pressure to two stages, i.e., ON control and OFF control. Although the duty control can be achieved by a single solenoid valve, control of the automatic transmission necessary for normal operation is provided. If the first or second solenoid valve becomes disabled, the lockup clutch can be kept from changing from the released state to the engaged state.

Yet another preferred embodiment of the present invention provides a hydraulic controller for an automatic transmission in which, when the predetermined traveling state is that where the vehicle is stopped, a combination of signal pressure by the OFF control of the first solenoid valve and signal pressure by the ON control of the second solenoid valve is used. Thus, the stopped state of the vehicle can be controlled in normal operation and if the first or second solenoid valve becomes disabled, the lockup clutch can be kept in its released state.

According to a yet another preferred embodiment, there is provided a hydraulic controller for an automatic transmission in which when the predetermined travel state is a startup from the stopped state, a combination, for example P102, of signal pressure of the OFF control of the first solenoid valve and signal pressure of the ON control of the second solenoid valve is used. Consequently, the startup from a vehicle stop can be controlled in normal operation and if the first or second solenoid valve becomes disabled, the lockup clutch can be kept in its released state.

According to another preferred embodiment of the present invention, there is provided a hydraulic controller of an automatic transmission wherein the predetermined traveling state is a state in which the lockup clutch is released during travel and wherein a combination of the signal pressure in duty control of the first solenoid valve and the signal pressure in ON control of the second solenoid valve is used. Consequently, the released state of the lockup clutch can be controlled during normal travel and if the first or second solenoid valve becomes disabled, the lockup clutch can be kept in the released state.

According to a further preferred embodiment of the present invention, there is provided a hydraulic controller for an automatic transmission in which when the predetermined traveling state is a state in which the lockup clutch is engaged during travel, and wherein, a combination of signal pressure by the ON control of the first solenoid valve and signal pressure by the OFF control of the second solenoid valve is used. Consequently, the engagement of the lockup clutch can be controlled during normal travel.

According to a still further preferred embodiment of the present invention, there is provided a hydraulic controller for an automatic transmission wherein the predetermined traveling state is a state in which the lockup clutch slips, and wherein, a combination of signal pressure by the duty control of the first solenoid valve and signal pressure by the OFF control of the second solenoid valve is used. Consequently, slipping of the lockup clutch can be controlled during vehicle's normal travel.

In a further preferred embodiment of the present invention, there is provided a hydraulic controller for an automatic transmission in which the predetermined traveling state is a startup of the vehicle from a stop at a relatively low oil temperature, and wherein a combination of signal pressure by the OFF control of the first solenoid valve and signal pressure by the ON control of the second solenoid valve is used. Thus, startup from a stop can be controlled in normal operation at a relatively low oil temperature and, if the first or second solenoid valve becomes disabled, the lockup clutch can be kept in the released state.

According to a still another preferred embodiment of the present invention, there is provided a hydraulic controller of an automatic transmission in which the predetermined state of travel is a state in which the lockup clutch is released at a relatively low oil temperature, and wherein a combination of a signal pressure by the ON control of the first solenoid valve and a signal pressure by the ON control of the second solenoid valve or a combination of a signal pressure by the OFF control of the first solenoid valve and a signal pressure by the OFF control of the second solenoid valve is used in the event of the aforementioned failure, and if operation of the first solenoid valve or the second solenoid valve becomes disabled, the first solenoid valve or the second solenoid valve is turned ON or OFF so as to establish the combination. Consequently, the released state of the lockup clutch can be controlled during vehicle's travel under normal conditions including a relatively low oil temperature and, if the first or second solenoid valve becomes disabled, the lockup clutch can be released.

According to a yet another preferred embodiment of the present invention, there is provided a hydraulic controller for an automatic transmission in which the first switching valve and the second switching valve each have a biasing member for biasing in a biasing direction toward one switch direction, wherein the first switching valve receives the signal pressure of the first solenoid valve in the biasing direction of the biasing member and the signal pressure of the second solenoid valve in a direction opposite to the biasing direction of the biasing member, and wherein the second switching valve receives the signal pressure of the first solenoid valve in a direction opposite to the biasing direction of the biasing member and the signal pressure of the second solenoid valve in a direction opposite to the biasing direction of the biasing member. Consequently, the positions of the first and second switching valves can be controlled based on the biasing force of the biasing member and hydraulic pressure as adjusted by the first and second solenoid valves in normal operation. If one of the first or second solenoid valves malfunctions, the switching position of the first or second switching valve can be controlled by adjusting the pressure of the other solenoid valve.

According to another preferred embodiment of the present invention, there is provided a hydraulic controller for an automatic transmission in which the first switching valve is a control valve disposed on a torque converter for switching the engagement state of the lockup clutch, and the second switching valve is a switching valve for selectively switching between at least two hydraulic pressures supplied to a hydraulic servo which engages a friction engaging element when the vehicle travels forward or to a hydraulic servo which engages a friction engaging element when the vehicle travels in reverse. This embodiment provides not only that control of the automatic transmission necessary in normal operation, but also if the first or second solenoid valve becomes disabled, the friction engaging element which is engaged with the lockup clutch when the vehicle travels forward or backward can be brought into the predetermined state. Further, two valves as previously necessary for controlling the lockup clutch to a predetermined state can be reduced to only one switching valve, so that the hydraulic controller can be made more compact.

According to a further preferred embodiment of the present invention, there is provided a hydraulic controller for an automatic transmission in which the predetermined state is that in which the lockup clutch is not changed from the released state to the engaged state when the first solenoid valve and the second solenoid valve operate normally. Consequently, the lockup clutch can be kept from changing from the released state to the engaged state. In particular, the engine can be kept from stopping when the vehicle stops. As a result, if any trouble occurs in the first or second solenoid valves, the vehicle can continue to travel.

According to still another preferred embodiment of the present invention, there is provided a hydraulic controller for an automatic transmission in which the automatic transmission mechanism includes a continuously variable transmission mechanism. Consequently, even if control of the lockup clutch is provided for with a single switching valve, for example, need is eliminated for a mechanism for mechanically releasing the lockup clutch, responsive to detection that the continuously variable transmission mechanism is positioned to provide a predetermined shift speed. As a result, the hydraulic controller can be formed more compact thereby making the entire automatic transmission more compact, reducing production costs and simplifying the structure.

BRIEF DESCRIPTION OF THE DRAWINGS

FIG. 4 is a table showing various states for solenoid valve SOL1 and a solenoid valve SOL2 in the configuration of FIG. 3 and with two stages of pressure adjustment;

FIG. 7 is a table showing various states for solenoid valve SOL1 and solenoid valve SOL2 connected in the configuration of FIG. 5 with three stages of pressure adjustment;

FIG. 9 is a table showing various states for solenoid valves SOL1 and SOL2 connected in the configuration of FIG. 5;

FIG. 11 is a table showing the various states of solenoid valve SOL1 and solenoid valve SOL2 connected as shown in FIG. 10 with pressure adjustment in two stages; and FIG. 12 is a table showing the various states of solenoid valve SOL1 and solenoid valve SOL2 connected as shown in FIG. 10 with pressure adjustment in three stages;

DESCRIPTION OF THE PREFERRED EMBODIMENTS

First Embodiment

Figure 1:
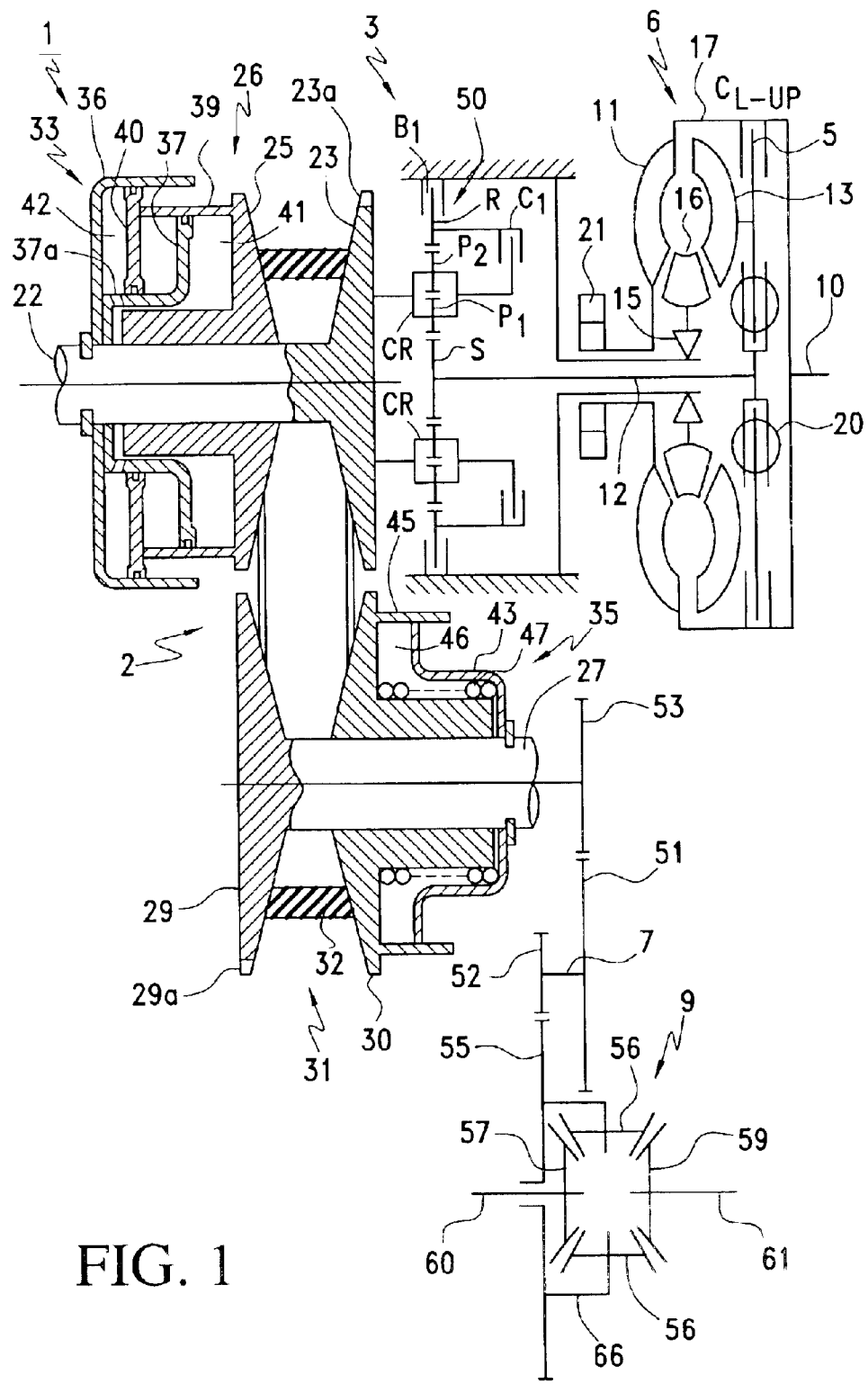
FIG. 1 is a schematic diagram showing a continuously variable transmission for a vehicle, to which the present invention is applied.

FIG. 1 is a diagram showing a transmission 1 for a vehicle, to which the present invention can be applied. This transmission 1 includes a belt type continuously variable transmission (CVT) mechanism 2, a forward/backward switching device 3, a torque converter 6 incorporating a lockup clutch 5, a counter shaft 7 and a differential unit 9, all of which are accommodated in an integral separable case.

The torque converter 6 includes a pump impeller 11 connected to an engine output shaft 10 through a front cover 17, a turbine runner 13 connected to an input shaft 12 and a stator 16 supported through an one-way clutch 15. The lockup clutch 5 is located between the input shaft 12 and the front cover 17. Reference numeral 20 denotes a damper spring interposed between the lockup clutch plate and the input shaft. Reference numeral 21 denotes an oil pump (hydraulic pressure generating source) which is drivably connected to the pump impeller 11.

The continuously variable transmission (CVT) mechanism 2 is provided with a primary pulley 26 formed of a fixed sheave 23 fixed to a primary shaft 22 and a movable sheave 25 slidably supported by the shaft, a secondary pulley 31 formed of a fixed sheave 29 fixed to the secondary shaft 27 and a movable sheave 30 slidably supported by that shaft and a metallic belt 32 wound around both pulleys.

A hydraulic actuator 33 with a double piston is disposed behind the movable sheave 25 on the primary side while a hydraulic actuator 35 with a single piston is disposed behind the movable sheave 30 on the secondary side. The hydraulic actuator 33 on the primary side includes a cylinder 36 and a reaction force receiving member 37 fixed to the primary shaft 22 and a cylindrical member 39 and a piston member 40 fixed to the movable sheave 25, thereby forming a first hydraulic chamber 41 within the cylindrical member 39, between the reaction force receiving member 37 and the movable sheave 25, while a second hydraulic chamber 42 is formed by a cylinder member 36 and a piston member 40. The first hydraulic chamber 41 communicates with the second hydraulic chamber 42 through a communicating hole 37a so as to generate an axial direction force double that of the secondary side hydraulic actuator 35 with the same hydraulic pressure. The secondary side hydraulic actuator 35 includes a reaction force receiving member 43 fixed to the secondary shaft 27 and a cylindrical member 45 fixed to the rear face of the movable sheave 30, which together form a single hydraulic chamber 46 with a pre-load spring 47 provided between the movable sheave 30 and the reaction force receiving member 43.

The forward/backward switching device 3 includes double pinion planetary gearing 50, a reverse (backward) brake $B_1$ and a direct clutch (forward clutch or input clutch) $C_1$. In the aforementioned planetary gearing 50, a sun gear S is coupled to the input shaft 12 and carriers CR supporting the first, second pinions P1, P2 are coupled to the primary side fixed sheave 23. Ring gear R is coupled to the aforementioned reverse brake $B_1$ which is a backward friction engaging element. Further, a direct clutch $C_1$, which is a forward friction engaging element, is interposed between the carrier CR and the ring gear R.

A large gear 51 and a small gear 52 are fixed to the counter shaft 7 and the large gear 51 is meshed with a gear 53 fixed to the secondary shaft 27 while the small gear 52 is meshed with a gear 55 in the differential unit 9. In the differential unit 9, rotation of a differential gear 56 supported by a differential case 66 having the aforementioned gear 55 is transmitted to right and left wheels 60, 61 through right/left side gears 57, 59.

Figure 2:
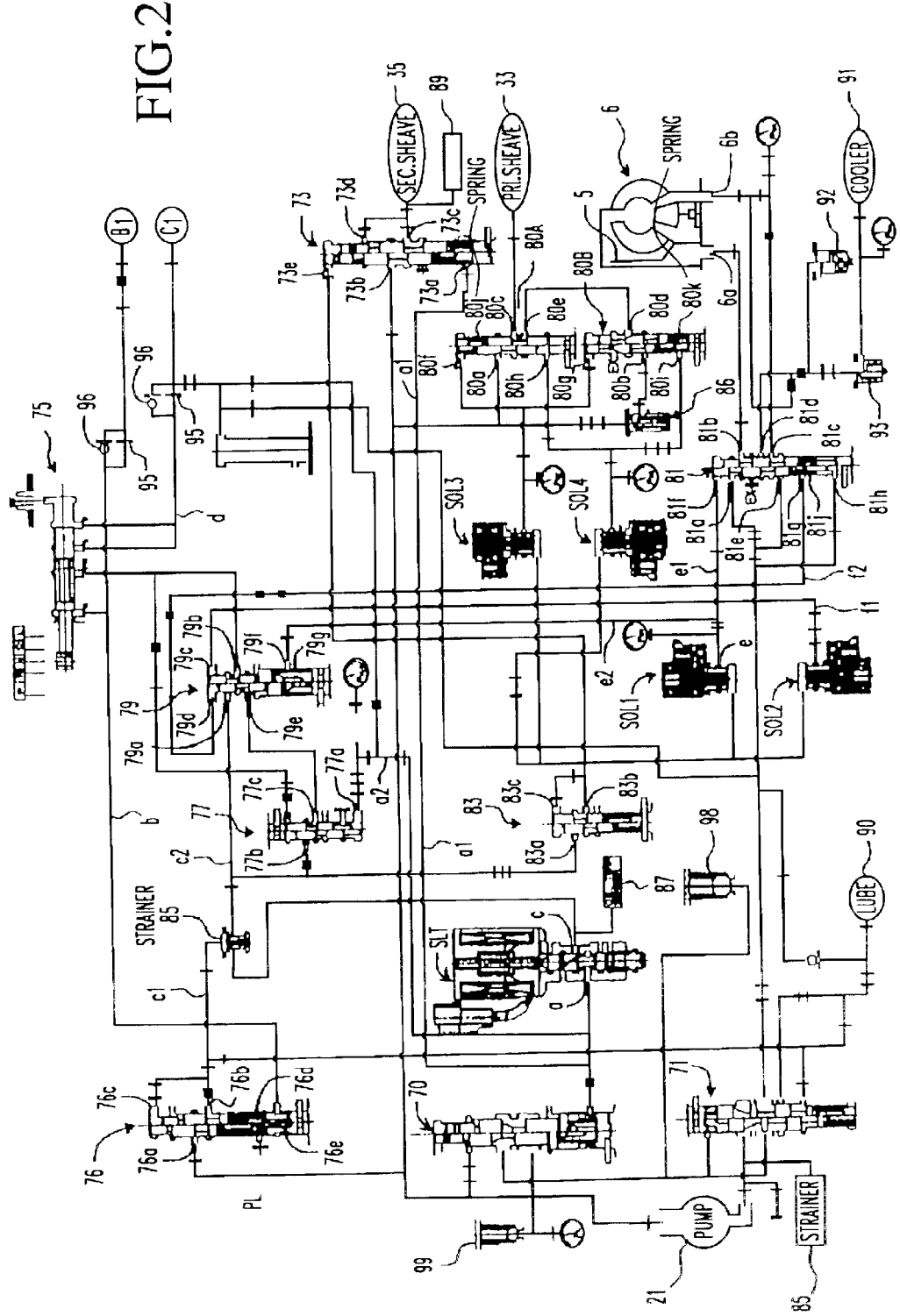
FIG. 2 is a hydraulic circuit diagram of the controller continuously variable transmission.

FIG. 2 shows the hydraulic circuit of the continuously variable transmission as including an oil pump 21, a primary regulator valve 70, a secondary regulator valve 71, a linear solenoid valve SLT for line pressure control, a secondary sheave control valve 73, and a manual shift valve 75 which is switched by the driver's operation of a shift lever or the like.

A clutch modulator valve 76 generates a so-called clutch (range) pressure (operating pressure, modulator pressure) supplied to hydraulic servos C1, B1 for the aforementioned direct clutch $C_1$ and reverse brake $B_1$. A control valve 77 provides a control pressure supplied to the hydraulic servo when the clutch and brake are switched. A relay valve 79 (second switching valve) switches the range pressure and control pressure. Because the control valve and relay valve are used mainly when a vehicle enters or leaves a garage, valve 77 is referred to as a garage control valve while valve 79 is referred to as a garage shift valve for convenience in the following description.

Reference numeral 80 (80A, 80B) denotes a ratio control valve, reference numeral 81 denotes a lockup control valve and reference numeral 83 denotes a solenoid modulator valve. The SOL 1, SOL 2 are (first and second) solenoid valves for switching the aforementioned lockup control valve (first switching valve, control valve) 81 and the aforementioned garage shift valve 79, which are normally closed type hydraulic pressure control (supply/release) valves. The SOL3 is a solenoid valve which actuates the normally closed ratio control valve 80 to the down-shift side in order to execute duty control, while SOL4 is a solenoid valve which actuates the ratio control valve 80 to the up-shift side in duty control.

Referring to FIG. 2, reference numeral 85 denotes a strainer, reference numeral 86 denotes an accumulator, reference numeral 87 denotes an oil temperature sensor, reference numeral 89 denotes a pressure sensor, reference numeral 90 denotes a lubricant passage, reference numeral 91 denotes a cooler, reference numeral 92 denotes a cooler bypass valve, reference numeral 93 denotes a check valve, and reference numerals 98, 99 denote a relief valve. As described previously, reference numeral 33 denotes a primary side hydraulic pressure actuator, reference numeral 35 denotes a secondary side hydraulic pressure actuator, reference numeral 6 denotes a torque converter, and reference numeral 5 denotes a lockup clutch. In FIG. 2, other components are designated by well known hydraulic symbols.

Next, operation of the aforementioned components will be explained. When the oil pump 21 is rotatably driven by the engine, hydraulic pressure is generated. The primary regulator valve 70 is controlled based on a SLT (control) pressure from the linear solenoid valve SLT in accordance with a signal from the controller, the signal being computed based on pulley ratio and throttle opening (that is, input torque), so that the hydraulic pressure is adjusted to a line pressure (PL). Further, the hydraulic pressure is adjusted to a secondary pressure (Psec) by the secondary regulator valve 71. Signal hydraulic pressure (SLT pressure) from the output port a of the linear solenoid valve SLT is supplied to a control oil chamber 73a in the secondary sheave control valve 73 through an oil passage a1.

The signal hydraulic pressure (SLT pressure) of the aforementioned linear solenoid valve SLT is supplied to a control oil chamber 77a of the garage control valve 77 through an oil passage a2. Consequently, the valve 77 adjusts the range pressure, input to a port 77b, to a clutch control pressure P.C. which is output from a port 77c to input port 79e of the garage shift valve 79.

In the clutch modulator valve 76, line pressure PL is input to the port 76a and output to an oil passage c2 from a port 76b through an oil passage c1 and the strainer 85. The output pressure (range pressure) from the output port is fed back to the control oil chamber 76c and the spool is biased toward the control oil chamber by a spring 76d, while hydraulic pressure is supplied to the other control oil chamber 76e through a small diameter plug from a reverse port R of the manual shift valve 75. Therefore, when the line pressure PL is low, the feedback pressure applied to the control oil chamber 76c does not overcome an initial load of the spring 76d, so that the clutch modulator valve 76 is positioned as shown in the left half in the drawing and outputs a range pressure as the line pressure. If the line pressure PL is raised, the feedback pressure is also raised correspondingly. If the feedback pressure overcomes the initial load of the spring 76d, the spring 76d is balanced with the feedback pressure in the control oil chamber 76c, so that a pressure substantially at a predetermined range pressure (PB1, PC1) is output. The range pressure of the aforementioned oil passage c1 is input to the input port c of the linear solenoid valve SLT through the strainer 85, while the range pressure of the oil passage c2 is input to the solenoid modulator valve 83.

The modulator valve 83 reduces the aforementioned range pressure input from the port 83a by a predetermined amount based on pressure fed back to the port 83c from the port 83b, and the adjusted range pressure is supplied to the respective solenoid valves SOL1 to SOL4 and the control oil chamber 73e in the aforementioned secondary sheave control valve 73. The valve 73 adjusts the line pressure input to the port 73b to the secondary sheave pressure PSS based on a signal hydraulic pressure (SLT pressure) input to the control oil chamber 73a through the oil passage al, and outputs pressure from port 73c and to the secondary side hydraulic pressure actuator 35.

The down-shift solenoid valve SOL3 executes duty control on hydraulic pressure input from the modulator valve 83 and outputs a control pressure from a port g to control oil chambers 80f, 80g of the ratio control valves 80A, 80B. The up-shift solenoid valve SOL4 executes duty control on hydraulic pressure input from the modulator valve 83 and outputs the control pressure from a port h to the control oil chambers 80h, 80i located opposite the control oil chambers 80f, 80g of the ratio control valves 80A, 80B. The line pressure PL is input to a port 80a of the ratio control valve 80A while a hydraulic pressure obtained by reducing the line pressure PL is input to a port 80b of the ratio control valve 80B through a check valve 86.

When both solenoid valves SOL3, SOL4 are turned ON, the control pressure is output from the output ports g, h and supplied to the control oil chambers 80f, 80g, 80h, 80i of the ratio control valves 80A, 80B. Hydraulic pressure higher than that in the control oil chambers 80g, 80h is supplied to the control oil chambers 80f, 80i. In opposition to the biasing force of the springs 80j, 80k, the ratio control valves 80A, 80B, positioned as shown in right half position, receive pressure at ports 80c, 80e. At this time, the port 80a is shut off from the ports 80c, 80e while the port 80d is also shut off from a drain port EX. That is, the primary side hydraulic pressure actuator 33 remains shut down so that there is no input/output of hydraulic pressure whereby the CVT2 is maintained at a predetermined transmission ratio.

For example if up-shift is instructed based on a throttle opening and vehicle velocity in D range, hydraulic pressure duty-controlled by the up-shift solenoid valve SOL4 is output to the control oil chambers 80h, 80i while the down-shift solenoid valve SOL3 is turned OFF. Then, the ratio control valve 80A is located in the left half shown position and the ratio control valve 80B is located in the right half shown position, so that the port 80a and the port 80c communicate with each other. Further, the port 80d is shut off from the drain port EX and the line pressure PL supplied from the primary regulator valve 70 to the port 80a is adjusted to a predetermined signal pressure based on the duty control of the solenoid valve SOL4 and supplied from the port 80c to the primary side hydraulic pressure actuator 33. A predetermined secondary sheave pressure PSS is applied to the secondary side hydraulic pressure actuator 35 in accordance with input torque by the secondary sheave control valve 73, so that a belt nipping force is maintained. If the aforementioned hydraulic pressure is supplied to the primary side hydraulic pressure actuator 33, the CVT2 is up-shifted in the direction in which the effective diameter of the primary pulley 26 is increased, that is, toward the over-drive side.

If down-shift is instructed based on the throttle opening and vehicle velocity in D range, for example, hydraulic pressure duty-controlled by the down-shift solenoid valve SOL3 is output to the control oil chambers 80f, 80g while the up-shift solenoid valve SOL 4 is turned OFF. Consequently, the ratio control valve 80A is positioned as shown in the right half side in the drawing and the ratio control valve 80B is changed to the left half position so as to shut off the port 80a from the port 80c. At the same time, the port 80d is made to communicate with the drain port EX, so that hydraulic pressure in the primary side hydraulic pressure actuator 33 is drained at a predetermined velocity. As a result, because a predetermined secondary sheave pressure PSS is supplied to the secondary side hydraulic pressure actuator 35, the CVT 2 is shifted down in the direction in which the effective diameter of the primary pulley 26 is decreased or toward the under-drive side.

An output port e of the solenoid valve SOL1 is connected to a port 8 if of the lockup control valve 81 through an oil passage e1 and to a port 79f of the garage shift valve 79 through an oil passage e2. The output port f of the solenoid valve SOL2 is connected to a port 79c of the garage shift valve 79 through an oil passage f1, while a port 79d of the garage shift valve 79 is connected to a port 81g of the lockup control valve 81 through an oil passage f2. Consequently, based on a signal pressure output by the solenoid valve SOL1 and the solenoid valve SOL2, the position (right half position or left half position) of the garage shift control valve 79 and the position (right half position or left half position) of the lockup control valve 81 are controlled (to be described in detail later).

If the garage shift control valve 79 is located at the left half position, the port 79e communicates with the port 79b so that SLT pressure from the linear solenoid valve SLT is input through a garage shift control valve 77 and output to a port PM of the manual shift valve 75. If the D range or the R range is selected while in this state, hydraulic servos C1, B1 of the clutch $C_1$ and brake $B_1$ are controlled directly by the SLT pressure of the linear solenoid valve SLT and the torque capacities of the clutch $C_1$ and brake $B_1$ are controlled by the SLT pressure of the linear solenoid valve SLT output based on the throttle opening. Consequently, corresponding to the torque capacity of the secondary sheave 35 as controlled by the secondary sheave control valve 73, which in turn is controlled by the linear solenoid valve SLT or the torque capacity of the belt, the torque capacities of the clutch $C_1$ and the brake $B_1$ are controlled so as to prevent the belt from slipping.

If the garage shift control valve 79 is located at the right half position, the port 79a communicates with the port 97b, so that the range pressure input from the clutch modulator valve 76 based on the primary regulator valve 70 is output to a port PM of the manual shift valve 75. If the D range or the R range is selected while in this state, the hydraulic servos C1, B1 of the clutch $C_1$ and brake $B_1$ are controlled by the range pressure of the clutch modulator valve 76, so that the torque capacities of the clutch $C_1$ and brake $B_1$ are respectively controlled by a constant range pressure from the clutch modulator valve 76. Consequently, particularly during vehicle's travel, the hydraulic servos C1, B1 of the clutch $C_1$ and the brake $B_1$ are not over-pressurized and the engagement of the clutch $C_1$ and the brake $B_1$ is maintained.

When the aforementioned lockup control valve 81 is located as shown at the left half side, the port 81a communicates with the port 81b, and a secondary pressure from the secondary regulator valve 71 is input to the port 81a and supplied from the port 81b to a lockup clutch OFF port 6a. The secondary pressure supplied to the lockup clutch OFF port 6a is input to the port 81c through a lockup clutch ON port 6b within the torque converter 6 and introduced to a cooler 91 through a port 81d. Consequently, the lockup clutch 5 is kept released.

If the lockup control valve 81 is located as shown at the right half side, the port 81a is shut off from the port 81b, the port 81b communicates with the drain port EX and the port 81e communicates with the port 81c. Consequently, secondary pressure from the secondary regulator valve 71 is input to the port 81e and supplied from the port 81c to the lockup clutch ON port 6b. Further, hydraulic pressure at the lockup clutch OFF port 6a is drained to the drain port EX through the port 81b. As a result, the lockup clutch 5 is kept engaged. Although the lockup clutch OFF port 6a is shut off from the lockup clutch ON port 6b because the lockup clutch 5 is engaged in the torque converter 6, the supplied secondary pressure is appropriately introduced to a cooler 91 and therefore no load is generated in the torque converter 6.

Next, control of the garage shift valve 79 and lockup control valve 81 by the solenoid valve SOL1 and the solenoid valve SOL2, will be explained with reference to FIGS. 3–8.

Figure 3:
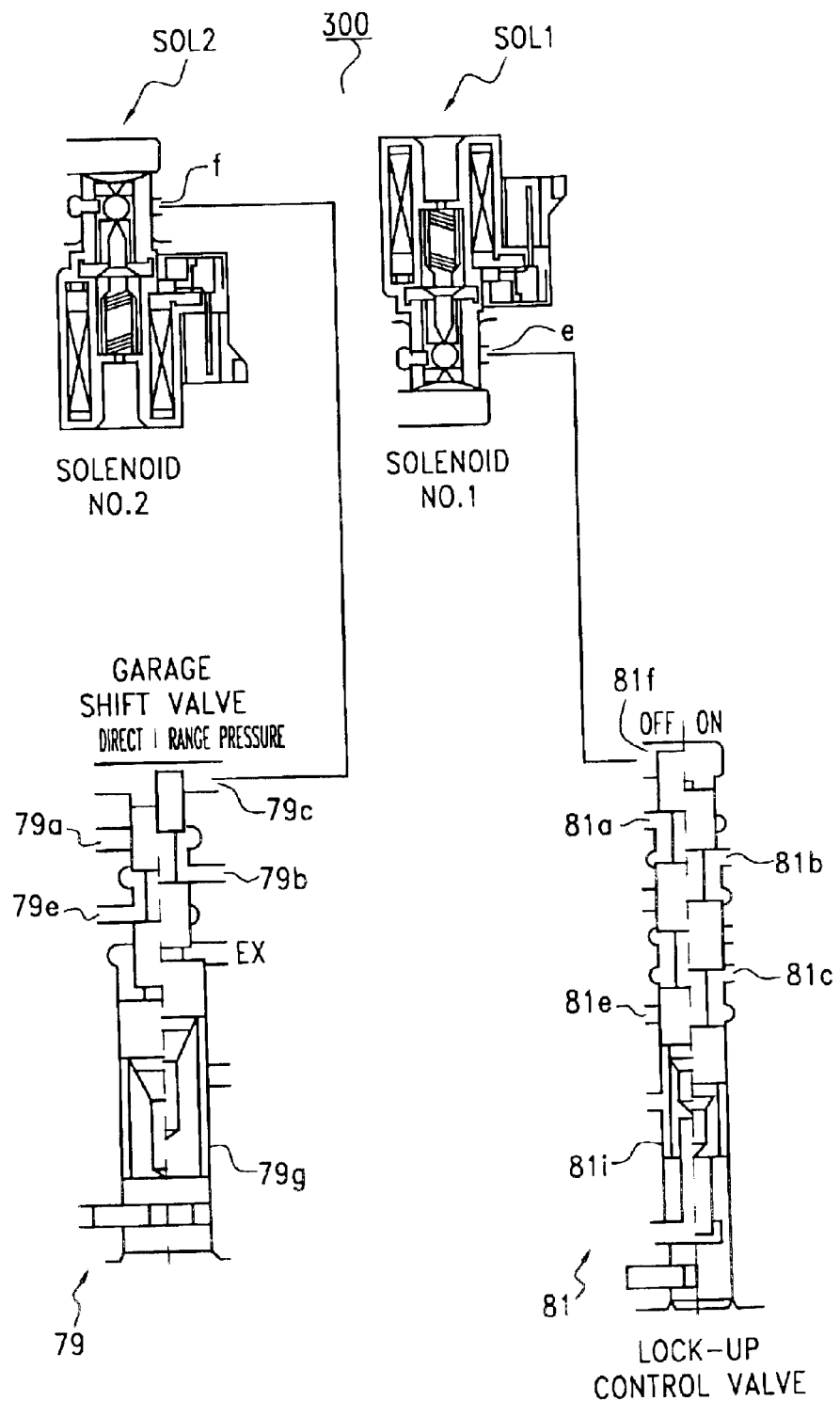
FIG. 3 is a schematic diagram showing a first valve configuration.

As shown in FIG. 3, for example in the connection configuration 300, the output port e of the solenoid valve SOL1 is connected to the port 81f of the lockup control valve 81, while output port f of the solenoid valve SOL2 is connected to the port 79c of the garage shift valve 79. That is, the lockup control valve 81 is controlled based on a signal pressure by ON/OFF control of the solenoid valve SOL1 and the garage shift valve 79 is controlled based on a signal pressure by ON/OFF control of the solenoid valve SOL2. The combinations P310 (hereinafter referred to as "pattern") of the signal pressures by ON/OFF control of the solenoid valve SOL1 and the solenoid valve SOL2 in the connection configuration 300 includes four types, i.e., patterns P311, P312, P313, P314, as shown in FIG. 4.

When the solenoid valve SOL1 operates properly, if the solenoid valve SOL1 is turned OFF, the lockup control valve 81 is located as at the left half side in FIG. 3 so that, as described above, the lockup clutch 5 is OFF (P311, P312). If the solenoid valve SOL1 is turned ON, the lockup control valve 81 is positioned as shown in the right half position (see FIG. 3), so that as described above, the lockup clutch 5 is ON (P313, 314). When the solenoid valve SOL2 is driven properly, if the solenoid valve SOL2 is turned OFF, the garage shift valve 79 is positioned at the right half position (see FIG. 3) so that, as described above, the hydraulic servos C1, B1 of the clutch $C_1$ and the brake $B_1$ control the range pressure (P311, P313). If the solenoid valve SOL2 is turned ON, the garage shift valve 79 is located at the left half position (see FIG. 3), so that as described above, the hydraulic servos C1, B1 of the clutch $C_1$ and the brake $B_1$ are directly controlled by the linear solenoid valve SLT (P312, P314).

The valve operation patterns P311, P312, generically referred to as pattern 310, turn OFF the lockup clutch 5. Particularly if the solenoid valve SOL1 fails in its ON state, the lockup control valve 81 remains at the right half position, so that the lockup clutch 5 is kept ON (that is, a state in which, although it is desired to release the lockup clutch 5, the lockup clutch is engaged). In this state, the engine is directly coupled to the drive shaft, causing stalling of the engine when the vehicle wheels stop. As described above, this situation necessitates a mechanism which mechanically detects the effective diameter of, for example, the primary pulley 26 and mechanically releases the lockup clutch 5 at a predetermined gear ratio (for example, a first speed stage). That is, in the connection configuration 300, the drive control of the lockup control valve 81 is provided by a single solenoid valve SOL1. Thus, the solenoid valve SOL1 needs to be driven for normal operation and with the patterns (signal combinations) P311, P312, a combination usable upon failure is not provided. Thus, taking into account the possibility of failure, a pattern (signal combination) of the connection style (configuration) 300 cannot be adopted.

Figure 5:
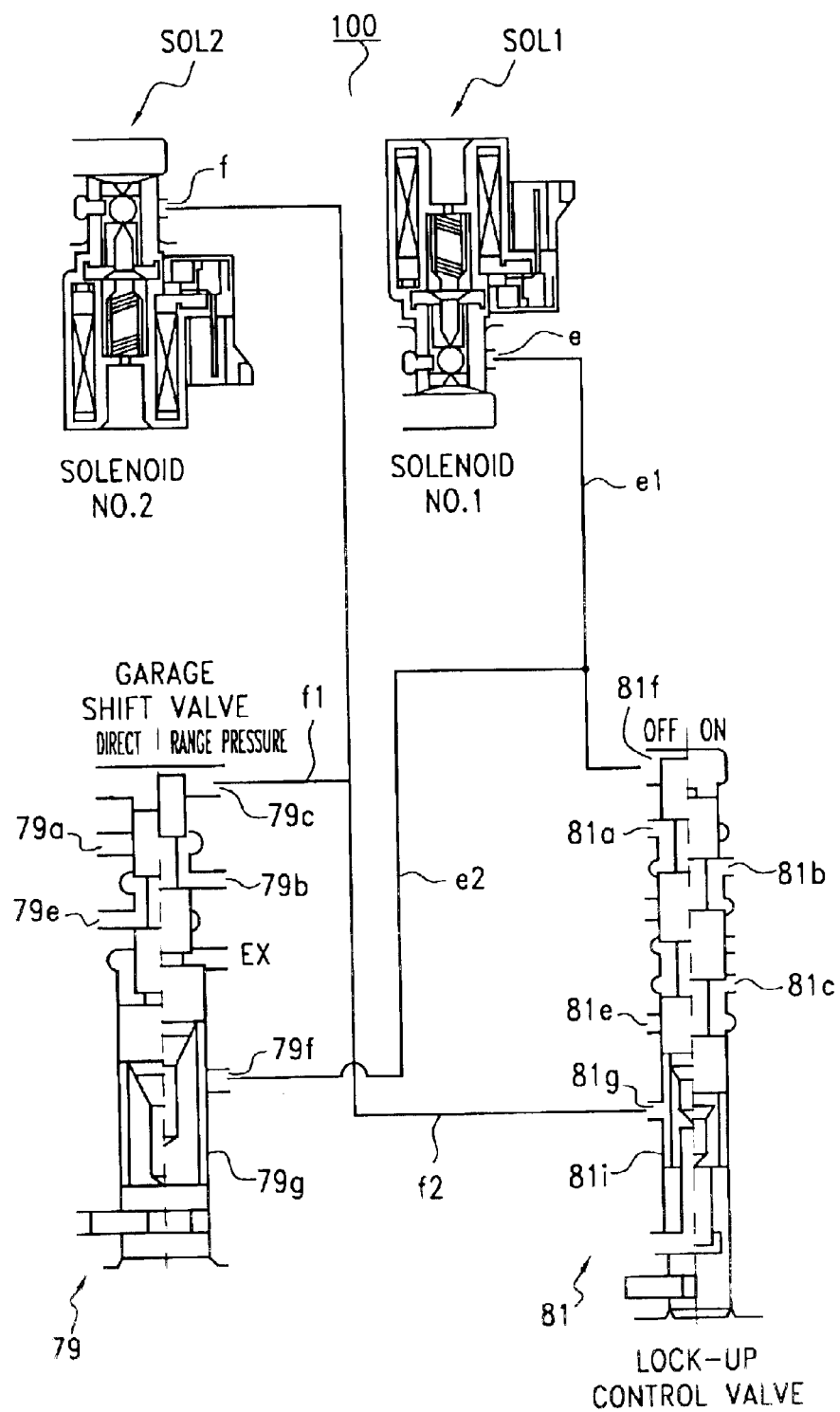
FIG. 5 is a schematic diagram showing a second valve configuration.
Figure 6:
FIG. 6 is a table showing various states for solenoid valve SOL1 and solenoid valve SOL2 connected in the configuration of FIG. 5 with two stages of pressure adjustment.

As shown in FIG. 5, in the connection style (configuration) 100 according to the present invention, the output port e of the solenoid valve SOL1 is connected to the port 81f of the lockup control valve 81 through the oil passage e1 and to the port 79f of the garage shift valve 79 through the oil passage e2. The output port f of the solenoid valve SOL2 is connected to the port 79c of the garage shift valve 79 through the oil passage f1 and to the port 81g of the lockup control valve 81 through the oil passage f2.

If in the connection style 100, the signal pressure, which is generated when the solenoid valve SOL1 or the solenoid valve SOL2 is ON is assumed to be 100%, while the signal pressure which is generated under the duty control, as described later, is assumed to be, for example, 50%, the biasing force of the spring (biasing member) 79g of the garage shift valve 79 is set at a value 50% or more of the corresponding hydraulic pressure, but less than 100% of the upward direction in FIG. 5 (if "hydraulic pressure of port 79c" "hydraulic pressure of port 79f"="50 to 100%,") the garage shift valve 79 is located at the left half position so as to execute direct control. Further, the biasing force of the spring (biasing member) 81i of the lockup control valve 81 is set to 50% or more of the signal pressure, but less than 100% of the upward direction in FIG. 5 (that is, if "hydraulic pressure of the port 81f"–"hydraulic pressure of port 81g"= "50 to 100%,") the lockup control valve 81 is located at the right half position so as to turn the lockup clutch 5 ON.

In the connection style 100, ON/OFF (two stages) of the solenoid valve SOL1 and the solenoid valve SOL2 provides four possible operation patterns Pl11, P112, P113, P114. When the solenoid valve SOL1 and the solenoid valve SOL2 operate normally, if the solenoid valve SOL1 and the solenoid valve SOL2 are OFF, the signal pressure of OFF control is input to the ports 81f, 81g of the lockup control valve 81 and the ports 79c, 79f of the garage shift valve 79. That is, although "OFF pressure" is input as the signal pressure, this signal pressure does not amount to an operating hydraulic pressure. Thus, in following description, "input of OFF pressure" is omitted. Because of the biasing forces of the spring 81i in the lockup control valve 81 and the spring 79g in the garage shift valve 81, the lockup control valve 81 is located at the left half position while the garage shift valve 79 is located at the right half position. At this time, the lockup clutch 5 is OFF and the hydraulic servos C1, B1 of the clutch $C_1$ and the brake $B_1$ are controlled by the range pressure (P111).

When the solenoid valve SOL1 and the solenoid valve SOL2 in the connection style 100 operate normally, if the solenoid valve SOL1 is OFF while the solenoid valve SOL2 is ON, the signal pressure (hereinafter referred to as "ON pressure") is input by ON control to the port 81g of the lockup control valve 81 and the port 79c of the garage shift valve 79 whereby the lockup control valve 81 is located at the left half position and the garage shift valve 79 is located at the left half position. The lockup clutch 5 is OFF and the hydraulic servos C1, B1 of the clutch $C_1$ and the brake $B_1$ are controlled directly by the linear solenoid valve SLT (P112).

When the solenoid valve SOL1 and the solenoid valve SOL2 in the connection style 100 operate normally, if the solenoid valve SOL1 is ON while the solenoid valve SOL2 is OFF, the ON pressure is input to the port 81f of the lockup control valve 81 and the port 79f of the garage shift valve 79 whereby the lockup control valve 81 is located at the right half position and the garage shift valve 79 is located at the right half position. The lockup clutch 5 is ON and the hydraulic servos C1, B1 of the clutch $C_1$ and the brake $B_1$ are controlled by the range pressure (P113).

When the solenoid valve SOL1 and the solenoid valve SOL2 in the connection style 100 operate normally, if the solenoid valve SOL1 and the solenoid valve SOL2 are both ON, the ON pressure is input to the ports 81*f*, 81*g* of the lockup control valve 81 and the ports 79*c*, 79*f* of the garage shift valve 79. Because the ON pressure is input to both valves from both sides, the lockup control valve 81 is located at the left half position and the garage shift valve 79 is located at the left half position due to the biasing forces of the spring 81*i* of the lockup control valve 81 and the spring 79*g* of the garage shift valve 79. The lockup clutch 5 is OFF and the hydraulic servos C1, B1 of the clutch $C_1$ and the brake $B_1$ are controlled by the range pressure (P114).

In control of the automatic transmission during normal travel, the clutch $C_1$ or the brake $B_1$ is engaged under direct control of the linear solenoid valve SLT. After change to control by the range pressure, the lockup clutch is engaged. If the solenoid valve SOL1 and the solenoid valve SOL2 operate normally, it is not necessary that the lockup clutch 5 is ON and that the hydraulic servos C1, B1 of the clutch $C_1$ and the brake $B_1$ are controlled directly by the linear solenoid valve SLT (for example, P314). Thus, the solenoid valve SOL1 and the solenoid valve SOL2 can be connected to both the lockup control valve 81 and the garage shift valve 79 as in style 100.

Although the valve operation patterns P111, P114 of the generic pattern P110 are patterns for turning OFF the lockup clutch 5, if the solenoid valve SOL1 fails in its ON state in the pattern P111 or the solenoid valve SOL2 fails in its OFF state in the pattern P114, the same state as the pattern P113 in normal operation is established. Consequently, the lockup control valve 81 is changed to its right half position so that, as indicated by shaded portions in the table, the lockup clutch 5 is turned ON (although it is desired to release the lockup clutch 5, the lockup clutch 5 is engaged). Thus, a signal combination usable at the time of failure, particularly in the patterns P111, P114, cannot be established, and if the possibility of a failure is to be accounted for, the pattern P110 cannot be adopted even in the connection style 100.

According to the first embodiment of the present invention, pattern P100 based on ON/DUTY/OFF control is achieved so that the solenoid valves SOL1 and the solenoid valve SOL2 in the connection style 100 are duty-controlled whereby the hydraulic pressure is adjustable to at least three stages. Consequently, nine combinations, P101, P102, P103, P104, P105, P106, P107, P108, and P109 are provided. Because the pattern P101 is the same as the pattern P111, the pattern P102 is the same as the pattern P112, the pattern P103 is the same as the pattern P113 and the pattern P104 is the same as the pattern P114, description thereof is omitted.

In the case where the solenoid valve SOL1 and the solenoid valve SOL2 are arranged in the style 100 configuration and are operating normally, if the solenoid valve SOL1 is DUTY operated while the solenoid valve SOL2 is OFF, the signal pressure of duty control (hereinafter referred to as duty pressure) is input to the port 81*f* of the lockup control valve 81 and the port 79*f* of the garage shift valve 79. Because the biasing force of the spring 81*i* of the lockup control valve 81 is set higher than the aforementioned duty pressure, the lockup control valve 81 is located at the left half position and the garage shift valve 79 is located at the right half position, the lockup clutch 5 is Off and the hydraulic servos C1, B1 of the clutch $C_1$ and the brake $B_1$ are controlled by the range pressure (P105).

Figure 8A:
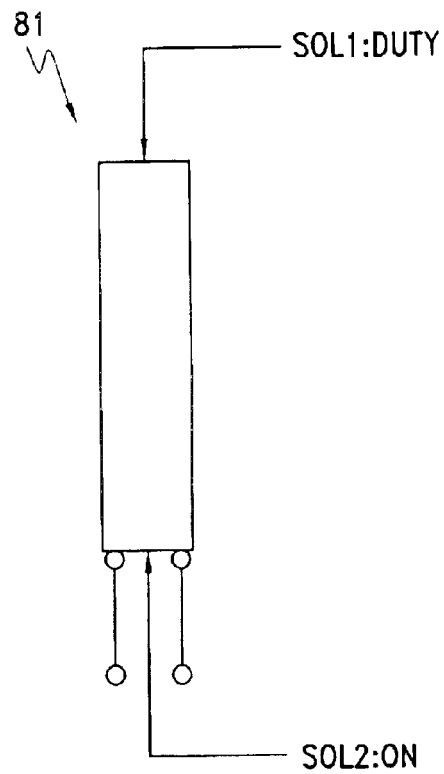
FIGS. 8A and 8B are schematic diagrams showing positions of a lockup control valve 81 connected as in FIG. 5.
Figure 8B:
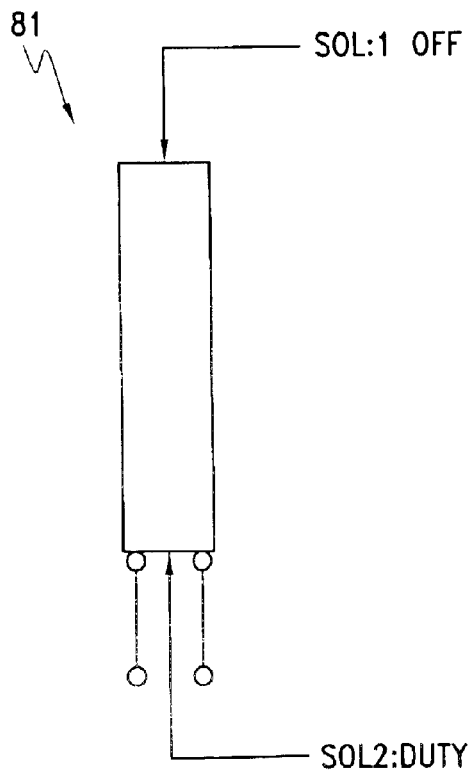

In the case where the solenoid valve SOL1 and the solenoid valve SOL2 are arranged in the style 100 configuration and are operating normally, if the solenoid valve SOL1 is DUTY operated while the solenoid valve SOL2 is ON, the duty pressure is input to the port 81*f* of the lockup control valve 81 and the port 79*f* of the garage shift valve 79. Further, the ON pressure is input to the port 81*g* of the lockup control valve 81 and the port 79*c* of the garage shift valve 79 (P106). Because the biasing force of the spring 79*g* of the garage shift valve 79 and the duty pressure of the solenoid valve SOL1 are set higher than that of the ON pressure of the solenoid valve SOL2, the garage shift valve 79 is located at the right half position and the hydraulic servos C1, B1 of the clutch $C_1$ and the brake $B_1$ are controlled by the range pressure. Although, as shown in FIG. 8(*a*), the duty pressure is input from the solenoid valve SOL1 in the lockup control valve 81 in opposition to the biasing force of the spring 81*i* (in the downward direction in the same Figure), the lockup control valve 81 is located at the left half position while the lockup clutch 5 is OFF, because the ON pressure is input from the solenoid valve SOL2 in the same direction as the biasing force of the spring 81*i* (in the upward direction in the same Figure).

In the case where the solenoid valve SOL1 and the solenoid valve SOL2 are connected in style 100 and are operating normally, if the solenoid valve SOL1 is OFF while the solenoid valve SOL2 is DUTY operated, the duty pressure is input to the port 81*g* of the lockup control valve 81 and the port 79*f* of the garage shift valve 79 (P107). Because the biasing force of the spring 79*g* of the garage shift valve 79 is set higher than the duty pressure of the solenoid valve SOL2, the garage shift valve 79 is located at the right half position and the hydraulic servos C1, B1 of the clutch $C_1$ and the brake $B_1$ are controlled by the range pressure. As shown in FIG. 8(*b*), the OFF signal pressure of the solenoid valve SOL1 is opposite to the biasing direction of the spring 81*i* (in the downward direction in the same Figure) in the lockup control valve 81 and the duty pressure is input from the solenoid valve SOL2 in the same direction as the biasing force of the spring 81*i* (in the upward direction of the same Figure). As a result, the lockup control valve 81 is located in the left half position and the lockup clutch 5 is OFF.

In the case where the solenoid valve SOL1 and the solenoid valve SOL2 in the connection style 100 and are operating normally, if the solenoid valve SOL1 is ON while the solenoid valve SOL2 is DUTY operated, the ON pressure is input to the port 81*f* of the lockup control valve 81 and the port 79*f* of the garage shift valve 79 and the duty pressure is input to the port 81*g* of the lockup control valve 81 and the port 79*f* of the garage shift valve 79. Because the biasing force of the spring 81*i* of the lockup control valve 81 and the duty pressure of the solenoid valve SOL1 are set higher than the ON pressure of the solenoid valve SOL2, the lockup control valve 81 is located at the left half position while the garage shift valve 79 is located at the right half position, the lockup clutch 5 is OFF and the hydraulic servos C1, B1 of the clutch $C_1$ and the brake $B_1$ are controlled by the range pressure (P108).

In the case where the solenoid valve SOL1 and the solenoid valve SOL2 are arranged in the connection style 100 are operating normally, if the solenoid valve SOL1 is DUTY operated while the solenoid valve SOL2 is DUTY operated, the duty pressure is input to the ports 81*f*, 81*g* of the lockup control valve 81 and the ports 79*c*, 79*f* of the garage shift valve 79. Consequently, based on the biasing force of the spring 81i of the lockup control valve 81 and the biasing force of the spring 79g of the garage shift valve 79, the lockup control valve 81 is located at the left half position while the garage shift valve 79 is located at the right half position, the lockup clutch 5 is OFF and the hydraulic servos C1, B1 of the clutch $C_1$ and the brake $B_1$ are controlled by the range pressure (P109).

Although the operation patterns P105, P108 turn OFF the lockup clutch 5, if the solenoid valve SOL1 fails in its ON state in the pattern P105 or the solenoid valve SOL2 fails in its OFF state in the pattern P108, the same state as the pattern P103 (P113) in normal operation is established. Consequently, the lockup control valve 81 is changed to its right half position, so that as indicated by shaded portions in the table of FIG. 7, the lockup clutch 5 is turned ON (although it is desired to release the lockup clutch 5, the lockup clutch 5 is engaged). Thus, a usage condition for failure in the patterns P105, P108 is not available, and if the possibility of failure is to be accounted for, these patterns cannot be adopted. In the pattern P109, both the solenoid valve SOL1 and the solenoid valve SOL2 are duty-controlled with reduction in the accuracy in the control of the hydraulic pressure and, thus, this pattern should be avoided if possible.

In the patterns P106, P107, even if as shown in FIG. 7, the solenoid valve SOL1 and the solenoid valve SOL2 fail in an ON/OFF state, a combination usable upon failure is provided so that these patterns can be adopted with allowance for failure, because the lockup control valve 81 is always located at the left half position while the lockup clutch 5 is always released, i.e., the lockup clutch 5 is never engaged upon failure. Consequently, the state that the lockup clutch 5 is OFF while the hydraulic servos C1, B1 of the clutch $C_1$ and the brake $B_1$ are controlled by the range pressure, which state is not available in the patterns P101, P104, can be achieved in pattern P106 or P107.

Next, an example of control on the automatic transmission which adopts the valve pattern P100 in the connection style 100 will be explained with reference to FIG. 9. As shown in FIG. 7, in the patterns P106, P107 the lockup clutch 5 is OFF and the hydraulic servos C1, B1 of the clutch $C_1$ and the brake $B_1$ are controlled by the range pressure. Thus, the-pattern P106 is advantageous because this is the same control state produced by the automatic transmission. That is, control by the automatic transmission is enabled by making only the solenoid valve SOL1 capable of duty-control.

For example, when the vehicle is stopped (P or N range), if the pattern P102 is adopted, the lockup clutch 5 is OFF and the hydraulic servos C1, B1 of the clutch $C_1$ and the brake $B_1$ are controlled directly by the linear solenoid valve SLT. Consequently, the lockup clutch 5 can be turned OFF at any time even upon failure.

At the time of startup from a stop state, e.g., N→D and N→R, if the aforementioned pattern P102 is adopted, the lockup clutch 5 is OFF and the hydraulic servos C1, B1 of the clutch $C_1$ and the brake $B_1$ are controlled directly by the linear solenoid valve SLT. Although the torque capacities of the clutch $C_1$ and the brake $B_1$ can be controlled so as to prevent the belt from slipping, i.e., so as to correspond to the torque capacity of the belt which is controlled by the signal hydraulic pressure of the linear solenoid valve SLT based on the throttle opening, the lockup clutch 5 can be turned OFF at any time, even upon failure.

In the case where the lockup clutch 5 is released (L-UP OFF) when the vehicle is traveling (D, R), if the pattern P106 is adopted, the lockup clutch 5 is OFF and the hydraulic servos C1, B1 of the clutch $C_1$ and the brake $B_1$ are controlled by the range pressure. However, the lockup clutch 5 can be turned OFF at any time even upon failure.

In the case of engaging or releasing the lockup clutch 5 by controlling (slippage control) the lockup clutch 5 during travel, if the pattern P105 is adopted, the position of the lockup control valve 81 can be changed gradually based on the DUTY pressure of the solenoid valve SOL1. Consequently, hydraulic pressure supplied to the lockup clutch 5 can be raised or dropped gradually. At this time, if the solenoid valve SOL1 fails in its ON state, the lockup clutch 5 is engaged. However, because the automatic transmission releases the lockup clutch 5 before the vehicle stops, the pattern P105 is replaced with the pattern P106 or the pattern P102, so that the lockup clutch 5 is never kept in the engaged state.

In the case of engaging the lockup clutch 5 during travel, if the pattern P103 is adopted, the hydraulic servos C1, B1 of the clutch $C_1$ and the brake $B_1$ can be controlled by the range pressure with the lockup clutch 5 in the ON state. Similarly, if the solenoid valve SOL1 fails in the ON state and the solenoid valve SOL2 fails in the OFF state, the lockup clutch 5 is engaged. However, because the automatic transmission releases the lockup clutch 5 before the vehicle stops, the pattern P105 is changed to the pattern P106 or the pattern P102, so that the lockup clutch 5 is never kept engaged. Accordingly, if the lockup clutch 5 is engaged due to failure during this control, there is no problem.

Next, the control when oil temperature is relatively low will be explained. Because the viscosity of oil to be controlled is increased as the oil temperature falls (to what hereinafter is refereed to as "a low temperature,") the signal pressure may become unstable if the solenoid valve SOL1 is duty-controlled. For this reason, at a low temperature, the pattern P106 for executing the duty control is not adopted, and control by the automatic transmission is adopted instead. Because the pattern P105 for controlling the lockup clutch 5 cannot be adopted, engagement/release of the lockup clutch 5 is not effected, and at a low temperature, the lockup clutch 5 is always released. The engagement control is not executed.

At the, time of startup of the vehicle at a low temperature, if the aforementioned pattern P102 is adopted, the lockup clutch 5 is OFF and the hydraulic servos C1, B1 of the clutch $C_1$ and the brake $B_1$ are controlled directly by the linear solenoid valve SLT. Although the torque capacities of the clutch $C_1$ and the brake $B_1$ can be controlled so as to prevent the belt from slipping, at a level corresponding to the torque capacity of the belt which is controlled by the signal hydraulic pressure of the linear solenoid valve SLT based on the throttle opening, the lockup clutch 5 can be turned OFF at any time, even upon failure.

To release (L-UP OFF) the lockup clutch 5 during travel (D, R) at a low temperature, the pattern P104 may be adopted, for example, so that the hydraulic servos C1, B1 of the clutch $C_1$ and the brake $B_1$ are controlled by the range pressure with the lockup clutch 5 in the OFF state. In this case, if the solenoid valve SOL2 fails in the OFF state, the lockup clutch 5 can be brought made into engagement as in the pattern P103 in normal operation. Then, failure of the solenoid valve SOL2 in the OFF state is detected, for example, by shift shock and if the solenoid valve SOL2 fails, the solenoid valve SOL2 is turned OFF, so that the same state as the pattern P101 in normal operation is established. Consequently, the hydraulic servos C1, B1 of the clutch $C_1$ and the brake $B_1$ can be kept controlled by the range pressure with the lockup clutch 5 in the OFF state.

In this state (with the lockup clutch 5 released at a low temperature), for example if the pattern P101 is adopted and the solenoid valve SOL1 fails in its ON state, the solenoid valve SOL2 is turned ON so as to establish pattern P104. As a result, the hydraulic servos C1, B1 of the clutch $C_1$ and the brake $B_1$ can be kept to be under control by the range pressure with the lockup clutch 5 in the OFF state.

As described above, the hydraulic pressure control apparatus of the automatic transmission of the first embodiment is capable of executing automatic transmission control necessary for normal operation by using a combination of the signal pressures from the solenoid valve SOL1 and the solenoid valve SOL2. Further, the lockup clutch 5 is prevented from changing from its released state to an engaged state, particularly when the vehicle is stopped, if the solenoid valve SOL1 or the solenoid valve SOL2 fails. Further, the control of the lockup clutch can be achieved with a single lockup control valve 81 so that the hydraulic controller can be made more compact. Further, a mechanism dedicated as a countermeasure against failure becomes unnecessary, thereby avoiding need for enlargement of the automatic transmission, avoiding increase in production cost and avoiding a more complicated configuration.

Second Embodiment

Next, the connection style 200, which is a modification of the connection style 100, will be explained with reference to FIGS. 10 to 13. Description of the features of the second embodiment which are the same as those of the first embodiment is omitted.

Figure 10:
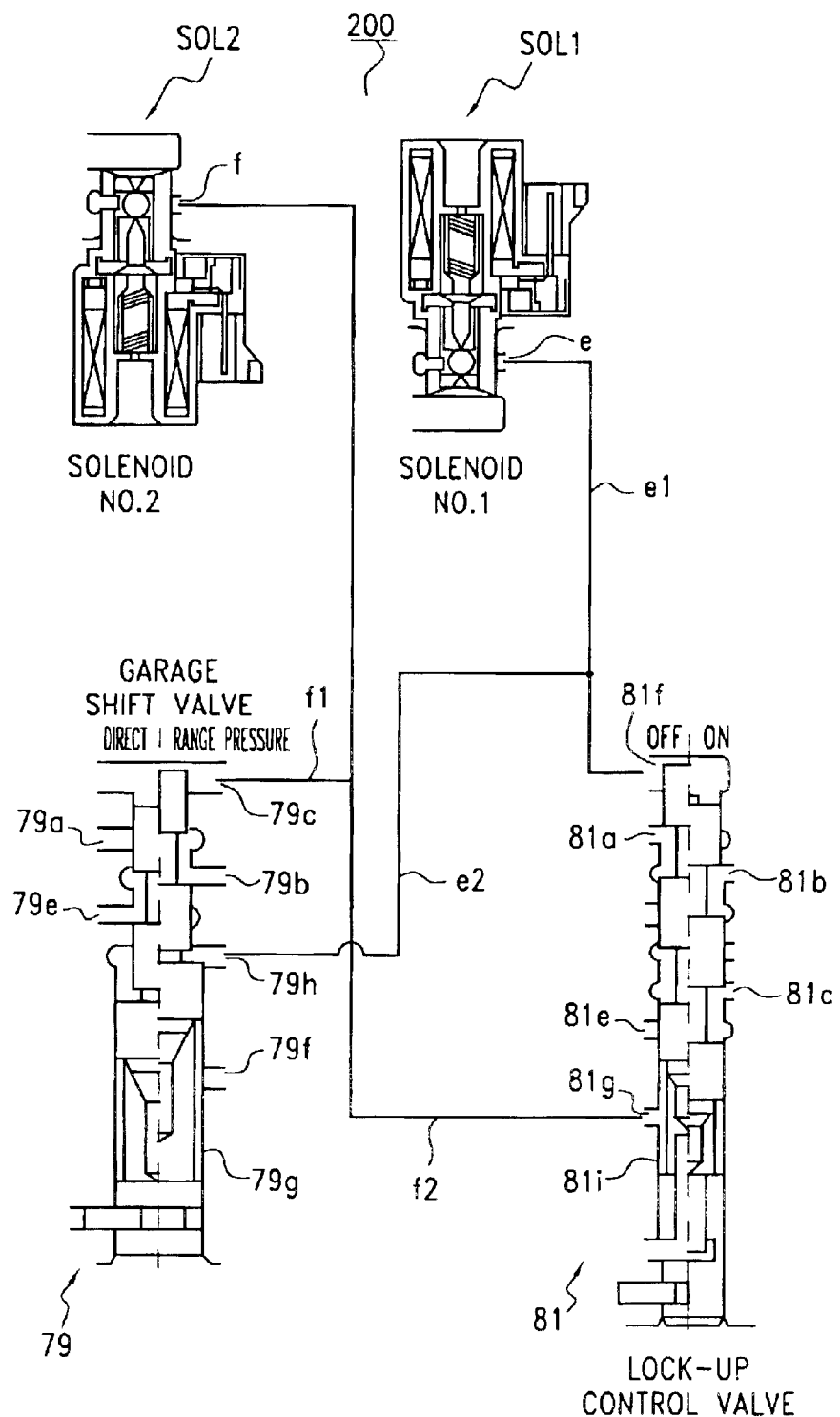
FIG. 10 is a schematic diagram showing a third valve configuration.

As shown in FIG. 10, in the valve connection arrangement style 200 according to the present invention, an output port e of a solenoid valve SOL1 is connected to a port 81f of a lockup control valve 81 through an oil passage e1 and to a port 79h of a garage shift valve 79 through an oil passage e2. An output port f of the solenoid valve SOL2 is connected to a port 79c of the garage shift valve 79 through an oil passage f1 and to a port 81g of the lockup control valve 81 through an oil passage f2.

In the connection style 200, hydraulic pressure input to the port 79c and the port 79h of the garage shift valve 79 acts in opposition to the biasing force of spring 79g. Assuming that the signal pressure generated in the ON state of the solenoid valve SOL1 or the solenoid valve SOL2 is 100% while the signal pressure generated under duty control is, for example, 50%, the biasing force of the spring 79g is set to 100% or more but less than 150% of that signal pressure in the upward direction in FIG. 10 (that is, if "hydraulic pressure on the port 79c"+"hydraulic pressure on the port 79h"="100 to 150%," the garage shift valve 79 is located at the left half position and controlled directly). The biasing force of a spring 81i in the lockup control valve 81 is set to 50% or more, but less than 100% of that signal pressure in the upward direction in FIG. 10 (that is, if "hydraulic pressure on the port 81f"−"hydraulic pressure on the port 81g"="50 to 100%," the lockup control valve 81 is located at the right half position and the lockup clutch 5 is turned ON).

In the connection style 200, the pattern P210 of ON/OFF (two stages) of the solenoid valve SOL1 and the solenoid valve SOL2 include the four patterns P211, P212, P213, P214 as shown in FIG. 4. In the case where the solenoid valve SOL1 and the solenoid valve SOL2 operate normally, if both the solenoid valve SOL1 and the solenoid valve SOL2 are OFF, the lockup control valve 81 is located at the left half position while the garage shift valve 79 is located at the right half position due to the biasing forces of the spring 81i of the lockup control valve 81 and the spring 79g of the garage shift valve 79. The lockup clutch 5 is OFF and the hydraulic servos C1, B1 of the clutch $C_1$ and the brake $B_1$ are controlled by the range pressure (P211).

In the case where the solenoid valve SOL1 and the solenoid valve SOL2 of the connection style 200 are operating normally, if the solenoid valve SOL1 is OFF while the solenoid valve SOL2 is ON, the ON pressure is input to the port 81g of the lockup control valve 81 and the port 79c of the garage shift valve 79. Because the biasing force of the spring 79g in the garage shift valve 79 is set higher than the ON pressure input force at the port 79c, the lockup control valve 81 is located at the left half position while the garage shift valve 79 is located at the right half position. The lockup clutch 5 is OFF and the hydraulic servos C1, B1 of the clutch $C_1$ and the brake $B_1$ are controlled by the range pressure (P212).

In the case where the solenoid valve SOL1 and the solenoid valve SOL2 of the connection style 200 are operating normally, if the solenoid valve SOL1 is ON while the solenoid valve SOL2 is OFF, the ON pressure is input to the port 81f of the lockup control valve 81 and the port 79h of the garage shift valve 79. Consequently, the lockup control valve 81 is changed to the right half position by hydraulic pressure input to the port 81f in opposition to the biasing force of the spring 81i. Because in the garage shift valve 79, the biasing force of the spring 79g is set higher than the ON pressure input to the port 79h, the garage shift valve 79 is changed to the right half position. That is, the lockup clutch 5 is ON and the hydraulic servos C1, B1 of the clutch $C_1$ and the brake $B_1$ are controlled by the range pressure (P213).

In the case where the solenoid valve SOL1 and the solenoid SOL2 of the connection style 200 are operating normally, if both the solenoid valve SOL1 and the solenoid valve SOL2 are ON, the ON pressure is input to the ports 81f, 81g of the lockup control valve 81 and the ports 79c, 79h of the garage shift valve 79. Consequently, the lockup control valve 81 is changed to the left half position by the force of the spring 81i of the lockup control valve 81 and further, the ON pressure of the solenoid valve SOL1 and the solenoid valve SOL2 acts in opposition to the biasing force of the spring 79g of the garage shift valve 79, so that the garage shift valve 79 is changed to the left half position. The lockup clutch is OFF and the hydraulic servos C1, B1 of the clutch $C_1$ and the brake $B_1$ are controlled directly by the linear solenoid valve SLT (P214).

In control by the automatic transmission during normal travel, as in the first embodiment, the clutch $C_1$ or the brake $B_1$ is engaged under direct control of the linear solenoid valve SLT. After change to control by the range pressure, the lockup clutch is engaged. If the solenoid valve SOL1 and the solenoid valve SOL2 operate normally, it is not necessary that the lockup clutch 5 be ON or that the hydraulic servos C1, B1 of the clutch $C_1$ and the brake $B_1$ be controlled directly by the linear solenoid valve SLT (for example, P314). Thus, connection of the solenoid valve SOL1 and the solenoid valve SOL2 to both the lockup control valve 81 and the garage shift valve 79 like the connection style 200 can be utilized.

Although the patterns P211, P214 turn OFF the lockup clutch 5, if the solenoid valve SOL1 fails in its ON state in the pattern P211 or if the solenoid valve SOL2 fails in its OFF state in the pattern P214, the same state as the pattern P213 in normal operation can be established. Consequently, the lockup control valve 81 is changed to its right half position, so that the lockup clutch 5 is turned ON (although it is desired to release the lockup clutch 5, the lockup clutch 5 is engaged). Thus, a usable pattern at the time of failure, particularly in cases of patterns P211, P214 cannot be established, and accounting for a possible failure, the pattern P210 cannot be adopted even in the connection style 200.

According to the second embodiment of the present invention, such a pattern 200 based on ON/DUTY/OFF control is achieved so that the solenoid valves SOL1 and the solenoid valve SOL2 are duty-controlled whereby the hydraulic pressure is adjustable to at least three stages. Consequently, nine combinations, P201, P202, P203, P204, P205, P206, P207, P208, P209 are enabled. Because the pattern P201 is the same as the pattern P211, the pattern P202 is the same as the pattern P212, the pattern P203 is the same as the pattern P213 and the pattern P204 is the same as the pattern P214, description thereof is omitted.

In the case where the solenoid valve SOL1 and the solenoid valve SOL2 in the connection style 200 operate normally, if the solenoid valve SOL1 is DUTY controlled while the solenoid valve SOL2 is OFF, the duty pressure is input to the port 81*f* of the lockup control valve 81 and the port 79*h* of the garage shift valve 79. Because the biasing force of the spring 81*i* of the lockup control valve 81 is set higher than the aforementioned duty pressure, the lockup control valve 81 is located at the left half position and the garage shift valve 79 is located at the right half position, the lockup clutch 5 is OFF and the hydraulic servos C1, B1 of the clutch $C_1$ and the brake $B_1$ are controlled by the range pressure (P205).

Figure 13A:
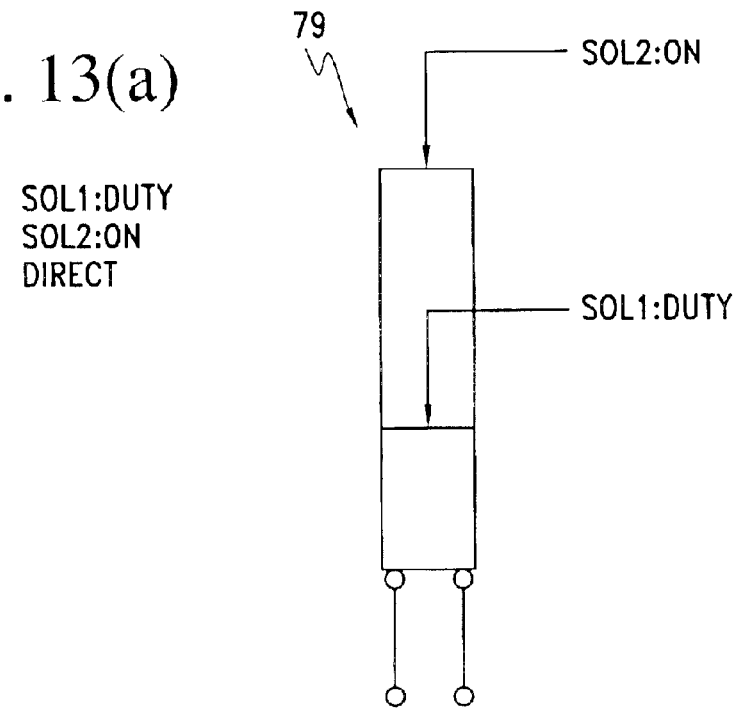
FIGS. 13A and 13B are schematic diagrams showing switching positions of the garage shift valve 79 connected as shown in FIG. 10.
Figure 13B:
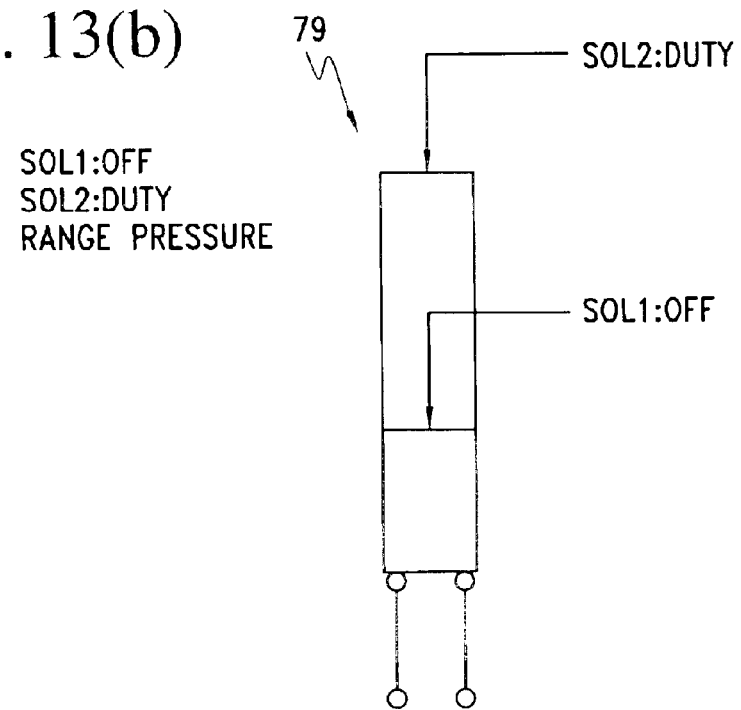

In the case where the solenoid valve SOL1 and the solenoid valve SOL2 are connected in configuration style 200 and are operating normally, if the solenoid valve SOL1 is DUTY controlled while the solenoid valve SOL2 is ON, the duty pressure is input to the port 81*f* of the lockup control valve 81 and the port 79*h* of the garage shift valve 79. Further, the ON pressure is input to the port 81*g* of the lockup control valve 81 and the port 79*c* of the garage shift valve 79 (P206). Consequently, the duty pressure is input from the solenoid valve SOL1 in the lockup control valve 81 in opposition to the biasing force of the spring 81*i* (in the downward direction in the same Figure). The ON pressure is input from the solenoid valve SOL2 in the same direction (in the upward direction in the same Figure) as the biasing force of the spring 81*i*. As a result, the lockup control valve 81 is located at the left half position and the lockup clutch 5 is OFF. Further, because as shown in FIG. 13(*a*), the ON pressure in the solenoid valve SOL1 and in the solenoid valve SOL2 is set higher than the biasing force of the spring 79*g* of the garage shift valve 79, the garage shift valve 79 is located at the left half position and the hydraulic servos C1, B1 of the clutch $C_1$ and the brake $B_1$ are controlled directly by the linear solenoid valve SLT.

In the case where the solenoid valve SOL1 and the solenoid valve SOL2 are connected in style 200 and are operating normally, if the solenoid valve SOL1 is OFF while the solenoid valve SOL2 is DUTY controlled, the duty pressure is input to the port 81*g* of the lockup control valve 81 and the port 79*h* of the garage shift valve 79 (P207). Then, the duty pressure is input to the lockup control valve 81 in the same direction as the biasing force of the spring 81*i* (in the upward direction in the same Figure). Consequently, the lockup control valve 81 is located at the left half position and the lockup clutch 5 is OFF. Further, as shown in FIG. 13(*b*), because the biasing force of the spring 79 in the garage shift valve 79 is set higher than the duty pressure in the solenoid valve SOL2, the garage shift valve 79 is located at the right half position and the hydraulic servos C1, B1 of the clutch $C_1$ and the brake $B_1$ are controlled by the range pressure.

In the case where the solenoid valve SOL1 and the solenoid valve SOL2 are connected in style 200 and are operating normally, if the solenoid valve SOL1 is ON while the solenoid valve SOL2 is DUTY controlled, the ON pressure is input to the port 81*f* of the lockup control valve 81 and the port 79*h* of the garage shift valve 79 and the duty pressure-is input to the port 81*g* of the lockup control valve 81 (P208). Then, because the biasing force of the spring 81*i* of the lockup control valve 81 and the duty pressure in the solenoid valve SOL2 are set higher than the ON pressure in the solenoid valve SOL1, the lockup control valve 81 is located at the left half position and the lockup clutch 5 is OFF (released). Further, because as shown in FIG. 13(*a*), the ON pressure of the solenoid valve SOL1 and the duty pressure in the solenoid valve SOL2 are set higher than the biasing force of the spring 79*g* of the garage shift valve 79, the garage shift valve 79 is located at the left half position and the hydraulic servos C1, B1 of the clutch $C_1$ and the brake $B_1$ are controlled directly by the linear solenoid valve SLT.

In the case where the solenoid valve SOL1 and the solenoid valve SOL2 are connected in style 200 and are operating normally, if the solenoid valve SOL1 is DUTY controlled while the solenoid valve SOL2 is DUTY controlled, the duty pressure is input to the ports 81*f*, 81*g* of the lockup control valve 81 and the ports 79*c*, 79*f* of the garage shift valve 79 (P209). Then, the lockup control valve 81 is located at the left half position and the garage shift valve 79 is located at the right position due to the biasing force of the spring 81*i* of the lockup control valve 81 and the biasing force of the spring 79*g* of the garage shift valve 79. Then, the lockup clutch 5 is OFF and the hydraulic servos C1, B1 of the clutch $C_1$ and the brake $B_1$ are controlled by the range pressure.

Although the patterns P205, P208 turn OFF (release) the lockup clutch 5, if the solenoid valve SOL1 fails in its ON state in the pattern P205 or the solenoid valve SOL2 fails in its OFF state in the pattern P208, the same state as the pattern P203 (P213) in normal operation is attained. Consequently, the lockup control valve 81 is changed to its right half position, so that the lockup clutch 5 is turned ON (that is, although it is desired to release the lockup clutch 5, the lockup clutch 5 is engaged). Thus, a failure in the patterns P205, P208 does not allow for establishment of a usable pattern, and if the possibility of failure is to be considered, these patterns cannot be adopted. Further, in the pattern P209, both the solenoid valve SOL1 and the solenoid valve SOL2 are duty-controlled thereby reducing the accuracy of control of the hydraulic pressure and, therefore, this pattern should not be used if possible.

In the patterns P206, P207, even if as shown in FIG. 7, the solenoid valve SOL1 and the solenoid valve SOL2 fail in an ON/OFF state, a usage condition is established upon failure so that these patterns can be adopted even upon failure, because the lockup control valve 81 is always located at the left half position while the lockup clutch 5 is always cut off (released). Consequently, the state in which the lockup clutch 5 is OFF while the hydraulic servos C1, B1 of the clutch $C_1$ and the brake $B_1$ are controlled directly by the linear solenoid valve SLT, which cannot be achieved in the pattern P204, can be achieved as the pattern P206. To attain the state in which the lockup clutch 5 is OFF while the hydraulic servos C1, B1 of the clutch $C_1$ and the brake $B_1$ are controlled by the range pressure, either the pattern P202 or the pattern P207 may be adopted.

By adopting the above-mentioned patterns P202, P203, P205, P206 and allowing only the solenoid valve SOL1 to be duty controlled, control of the automatic transmission is enabled as in the first embodiment.

As described above, the hydraulic pressure control apparatus of the automatic transmission according to the second embodiment is capable of executing automatic transmission control necessary in normal operation by using a combination of the signal pressures form the solenoid valve SOL1 and the solenoid valve SOL2, and preventing the lockup clutch 5 from being changed from released to engaged particularly when the vehicle is stopped, even if the solenoid valve SOL1 or the solenoid valve SOL2 fails. Further, the control of the lockup clutch can be achieved with a single lockup control valve 81 so that the hydraulic controller can be made more compact. Further, a mechanism dedicated to a countermeasure against failure becomes unnecessary thereby avoiding need for enlargement of the automatic transmission, avoiding increase in production cost and avoiding complication of the configuration.

In the preferred embodiments, the present invention is applied to an automatic transmission having a continuously variable transmission mechanism or to the garage shift valve and the lockup control valve as the switching valves. However, the present invention may be applied to any automatic transmission so long as it controls two switching valves with two solenoid valves. For example, the present invention may be applied to a hydraulic controller in an automatic transmission having a step transmission mechanism, so that a predetermined transmission stage (predetermined state) is attained when the solenoid valve fails.

In the aforementioned embodiments, the duty control of the solenoid valve SOL1 and the solenoid valve SOL2 refers to the generation of the duty pressure (for example, 50% hydraulic pressure) by repeated ON/OFF operation of the solenoid valve SOL1 and the solenoid valve SOL2 at a relatively high speed. Thus, if the solenoid valve SOL1 and the solenoid valve SOL2 fail, the ON state or OFF state is fixed. The present invention is not restricted to such an embodiment, but may also be applied to an embodiment in which the duty control is provided by controlling the degree of valve opening of the solenoid valve SOL1 and the solenoid valve SOL2. In this later case, even if one solenoid valve is frozen in a state in which the duty pressure is generated, the lockup control valve 81 can be located at the left half position (released state for the lockup clutch 5) by adjusting the pressure using the other solenoid valve.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The disclosure of Japanese Patent Application No. 2001-314367 filed on Oct. 11, 2001, including the specification, drawings and abstract, is incorporated herein by reference in its entirety.

What is claimed is:

1. A hydraulic controller for controlling an automatic transmission mechanism in a vehicle by adjusting and switching hydraulic pressure of a hydraulic pressure generating source, the hydraulic controller comprising:

a first solenoid valve for outputting a signal pressure by adjusting a supplied hydraulic pressure;

a second solenoid valve for outputting a signal pressure by adjusting a supplied hydraulic pressure;

a first switching valve which is switched responsive to the signal pressure of the first solenoid valve and the signal pressure of the second solenoid valve; and a second switching valve which is switched responsive to the signal pressure of said first solenoid valve and the signal pressure of said second solenoid valve, wherein at least one of said first solenoid valve and said second solenoid valve provides three or more stages of signal pressures and wherein plural, predetermined combinations of the signal pressure of said first solenoid valve and the signal pressure of said second solenoid valve are used to establish a predetermined state in the automatic transmission when said first solenoid valve or said second solenoid valve becomes disabled in a predetermined state of travel.

2. A hydraulic controller according to claim 1 wherein at least one of said first solenoid valve and said second solenoid valve is freely duty-controlled so that the signal pressure can be selectively adjusted to one of three stages, said three stages being ON control, duty control and OFF control.

3. A hydraulic controller according to claim 2 wherein:

said first switching valve and said second switching valve have a biasing member for biasing in a biasing direction toward one switching position;

wherein said first switching valve receives the signal pressure of said first solenoid valve in the biasing direction of said biasing member and the signal pressure of said second solenoid valve in a direction opposite to the biasing direction of said biasing member; and wherein said second switching valve receives the signal pressure of said first solenoid valve in a direction opposite to the biasing direction of said biasing member and the signal pressure of said second solenoid valve in the biasing direction of said biasing member.

4. A hydraulic controller according to claim 3 wherein the automatic transmission mechanism includes continuously variable transmission mechanism.

5. A hydraulic controller according to claim 3 wherein:

said first switching valve is a control valve for switching the engagement of a lockup clutch disposed on a torque converter, and said second switching valve is a switching valve for selectively switching between at least two hydraulic pressures supplied to a hydraulic servo for a friction engaging element engaged when the vehicle travels forward or to a hydraulic servo for a friction engaging element engaged when the vehicle travels in reverse.

6. A hydraulic controller according to claim 5 wherein said predetermined state in the automatic transmission is a state in which said lockup clutch is released.

7. A hydraulic controller according to claim 6 wherein:

said first solenoid valve is duty-controlled so that its signal pressure can be adjusted to one of three stages, said three stages being ON control, duty control and OFF control; and wherein said second solenoid valve provides two stages of signal pressure, said two stages being ON control and OFF control.

8. A hydraulic controller according to claim 7 wherein said predetermined state of travel is the vehicle stopped state, with the signal pressure in OFF control by said first solenoid valve and the signal pressure in the ON control by said second solenoid valve.

9. A hydraulic controller according to claim 7 wherein said predetermined state of travel is startup of the vehicle from a stop, with the signal pressure of the OFF control by said first solenoid valve and the signal pressure of the ON control by said second solenoid.

10. A hydraulic controller according to claim 7 wherein the predetermined state of travel is a state in which the lockup clutch is released with the signal pressure in the duty control by said first solenoid valve and the signal pressure in the ON control by said second solenoid valve.

11. A hydraulic controller according to claim 7 wherein when the predetermined state of travel is a state in which the lockup clutch is engaged, with the signal pressure in the ON control by said first solenoid valve and signal pressure in the OFF control by said second solenoid valve.

12. A hydraulic controller according to claim 7 wherein when the predetermined state of travel is a state in which the lockup clutch slips with the signal pressure in the duty control by said first solenoid valve and the signal pressure in the OFF control by said second solenoid valve.

13. A hydraulic controller according to claim 7 wherein when the predetermined state of travel is startup of the vehicle from a stopped state with a relatively low oil temperature, with the signal pressure in OFF control by said first solenoid valve and the signal pressure in the ON control by said second solenoid valve.

14. A hydraulic controller according to claim 7 wherein the state of travel is a state in which the lockup clutch is released at a relatively low oil temperature during travel, with (1) the signal pressure in the ON control of said first solenoid valve and the signal pressure in the ON control of said second solenoid valve or (2) the signal pressure in the OFF control of said first solenoid valve and the signal pressure in the OFF control of said second solenoid valve, and wherein, responsive to disablement of said first solenoid valve or said second solenoid, said first solenoid valve or said second solenoid valve is turned ON or OFF to establish the combination.

15. A hydraulic controller according to claim 7 wherein the automatic transmission mechanism includes continuously variable transmission mechanism.

16. A hydraulic controller according to claim 1 wherein the automatic transmission mechanism includes continuously variable transmission mechanism.

17. A hydraulic controller according to claim 1 wherein:

said first switching valve and said second switching valve have a biasing member for biasing in a biasing direction toward one switching position;

wherein said first switching valve receives the signal pressure of said first solenoid valve in the biasing direction of said biasing member and the signal pressure of said second solenoid valve in a direction opposite to the biasing direction of said biasing member; and wherein said second switching valve receives the signal pressure of said first solenoid valve in a direction opposite to the biasing direction of said biasing member and the signal pressure of said second solenoid valve in the biasing direction of said biasing member.

18. A hydraulic controller according to claim 17 wherein said first switching valve is a control valve for switching the engagement state of a lockup clutch disposed on a torque converter, and said second switching valve is a switching valve for selectively switching between at least two hydraulic pressures supplied to a hydraulic servo for a friction engaging element engaged when the vehicle travels forward or to a hydraulic servo for a friction engaging element engaged when the vehicle travels in reverse.

19. A hydraulic controller according to claim 18 wherein the predetermined state of travel is a state in which the lockup clutch is released.

* * * * *

UNITED STATES PATENT AND TRADEMARK OFFICE
CERTIFICATE OF CORRECTION

PATENT NO. : 6,835,147 B2
DATED : December 28, 2005
INVENTOR(S) : Iwata et al.

It is certified that error appears in the above-identified patent and that said Letters Patent is hereby corrected as shown below:

Column 22,
Line 37, "includes continuously" should read -- includes a continuously --.

Column 23,
Line 35, "second solenoid" should read -- second solenoid valve --.

Column 24,
Lines 2 and 5, "includes continu-" should read -- includes a continu- --.

Signed and Sealed this

Fourteenth Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,835,147 B2
DATED : December 28, 2004
INVENTOR(S) : Iwata et al.

It is certified that error appears in the above-identified patent and that said Letters Patent is hereby corrected as shown below:

Column 22,
Line 37, "includes continuously" should read -- includes a continuously --.

Column 23,
Line 35, "second solenoid" should read -- second solenoid valve --.

Column 24,
Lines 2 and 5, "includes continu-" should read -- includes a continu- --.

This certificate supersedes Certificate of Correction issued February 14, 2006.

Signed and Sealed this

Twenty-first Day of March, 2006

JON W. DUDAS
*Director of the United States Patent and Trademark Office*